United States Patent [19]

French et al.

[11] Patent Number: 6,125,972
[45] Date of Patent: *Oct. 3, 2000

[54] SECURITY APPARATUS AND METHOD FOR SHOPPING CARTS AND THE LIKE

[75] Inventors: John R. French; David M. Giuntoli; Thomas K. Bailey, all of San Diego, Calif.; Philip J. Witham, Portland, Oreg.

[73] Assignee: Carttronics LLC, San Diego, Calif.

[*] Notice: This patent is subject to a terminal disclaimer.

[21] Appl. No.: 09/026,652

[22] Filed: Feb. 20, 1998

Related U.S. Application Data

[63] Continuation-in-part of application No. 08/843,954, Apr. 17, 1997, Pat. No. 5,881,846.

[51] Int. Cl.⁷ .................................................. B60B 33/00
[52] U.S. Cl. .............................. 188/1.12; 188/5; 188/111; 280/33.994
[58] Field of Search ................................. 188/1.12, 4 B, 188/4 R, 5, 6, 7, 19, 31, 60, 62, 69, 161, 167, 111, 110; 280/33.994; 16/35 R

[56] References Cited

U.S. PATENT DOCUMENTS

| | | |
|---|---|---|
| 2,759,738 | 8/1956 | Reiter . |
| 2,964,140 | 12/1960 | Berezny .......................... 280/33.994 |
| 3,415,144 | 12/1968 | Carson . |
| 3,717,225 | 2/1973 | Rashbaum et al. . |
| 3,751,757 | 8/1973 | Stosberg et al. ........................... 16/35 |
| 4,472,706 | 9/1984 | Hodge et al. . |
| 4,503,943 | 3/1985 | Tsukui ....................................... 188/5 |
| 4,868,544 | 9/1989 | Havens . |
| 4,908,604 | 3/1990 | Jacob . |
| 4,987,406 | 1/1991 | Reid . |
| 5,053,768 | 10/1991 | Dix, Jr. . |
| 5,194,844 | 3/1993 | Zelda . |
| 5,283,550 | 2/1994 | MacIntyre . |
| 5,315,290 | 5/1994 | Moreno et al. . |
| 5,394,962 | 3/1995 | Gray ....................................... 188/1.12 |

FOREIGN PATENT DOCUMENTS

| | | |
|---|---|---|
| 2053630 | 4/1971 | France . |
| 95/13953 | 5/1995 | WIPO . |
| 95/20515 | 8/1995 | WIPO . |
| 96/21206 | 1/1996 | WIPO . |

*Primary Examiner*—Christopher P. Schwartz
*Assistant Examiner*—Pamela J. Lipka
*Attorney, Agent, or Firm*—Brown, Martin, Haller & McClain, LLP

[57] ABSTRACT

A security apparatus for a shopping cart or other wheeled vehicle having a plurality of casters has a braking member rotatably mounted on a wheel axle of one of the wheels. The braking member is movable between a raised position spaced above the ground surface and an operative position contacting the ground surface, and has a portion projecting radially outwardly from the outer peripheral rim of the wheel at least in the operative position so as to separate the wheel from the ground and impede movement of the vehicle. A locking device releasably locks the braking member in the raised position, and is released by a trigger device in response to a signal from a signal system extending around an area in which carts are to be retained, at which point the braking member rotates into the operative position, stopping normal movement of the cart.

37 Claims, 10 Drawing Sheets

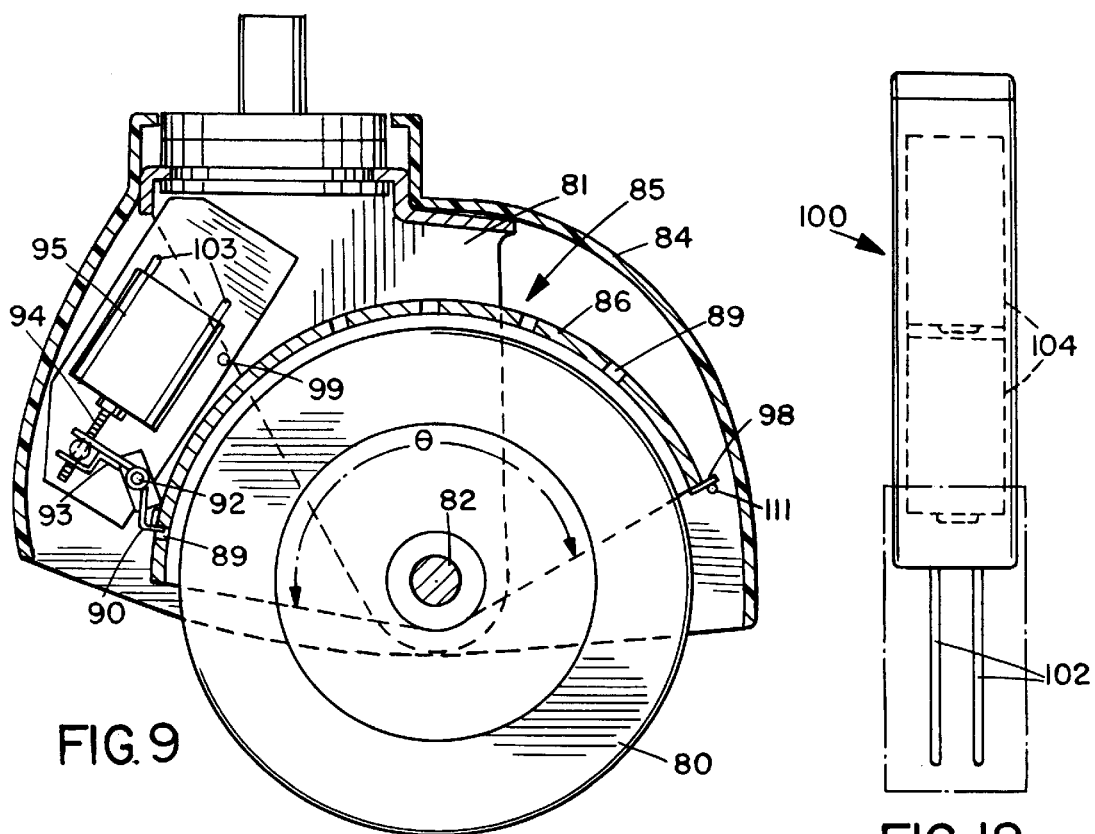
FIG. 9
FIG. 12
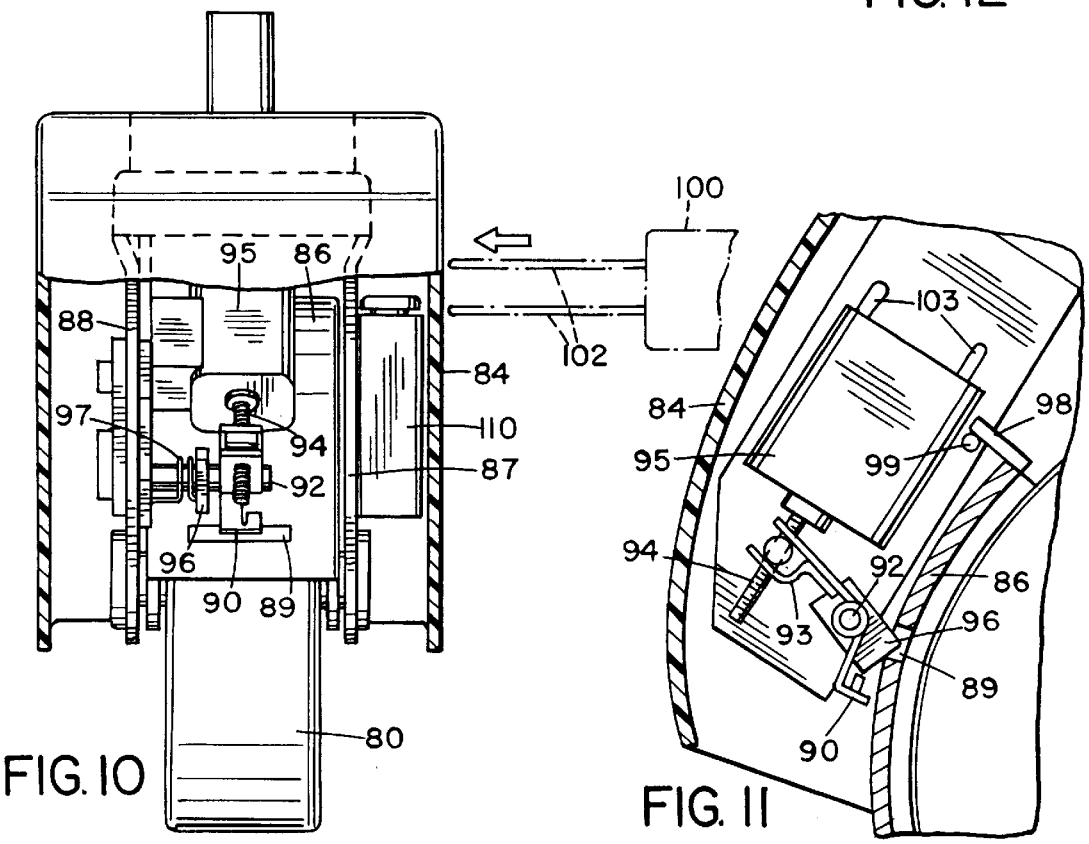
FIG. 10
FIG. 11

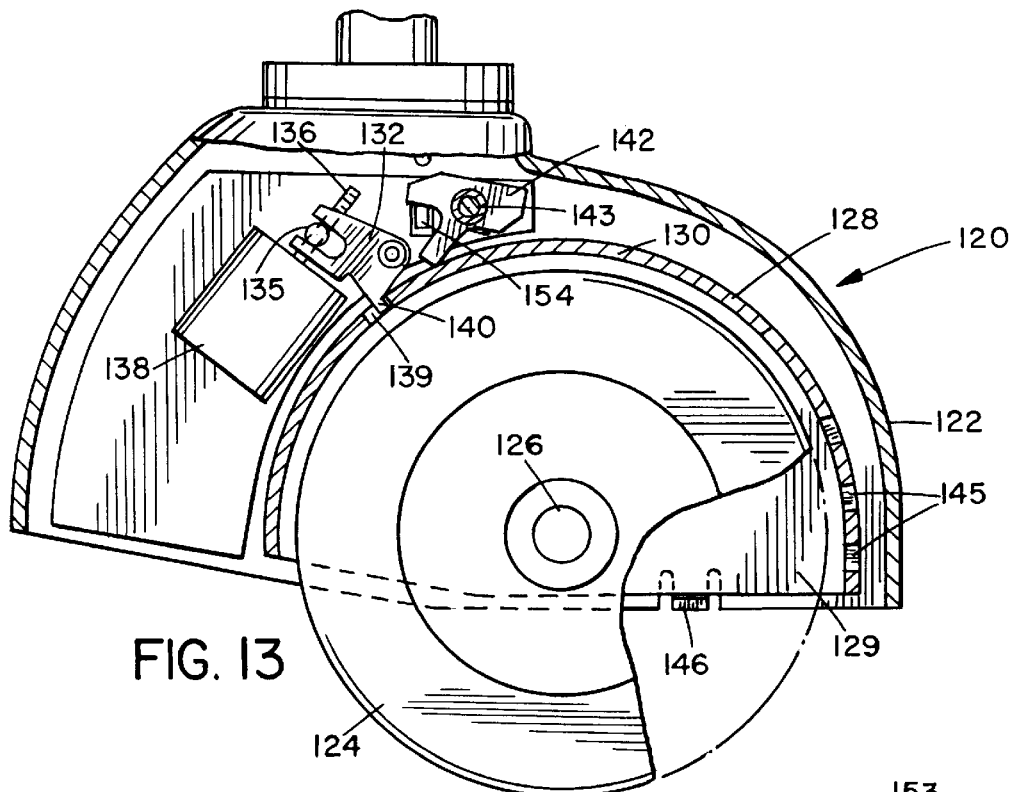
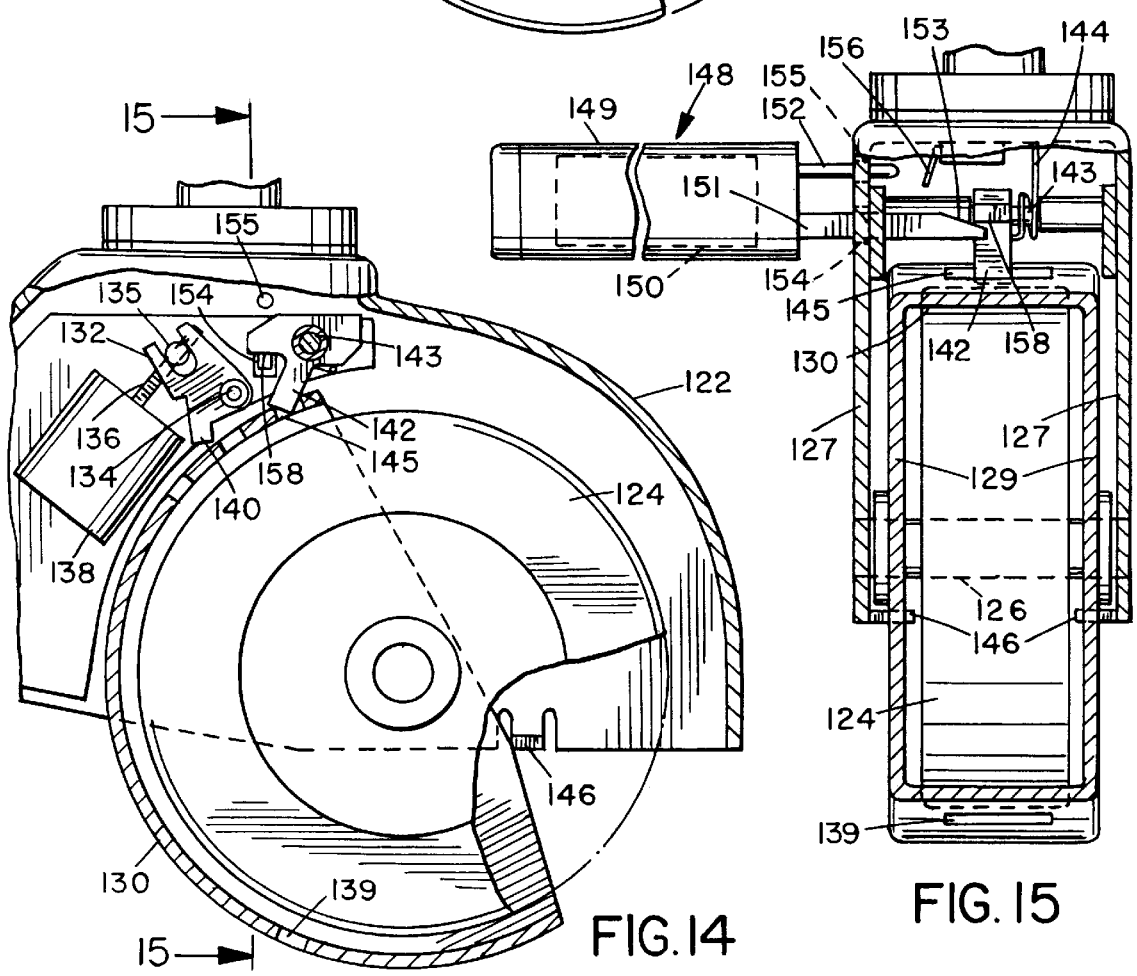
FIG. 13
FIG. 14
FIG. 15

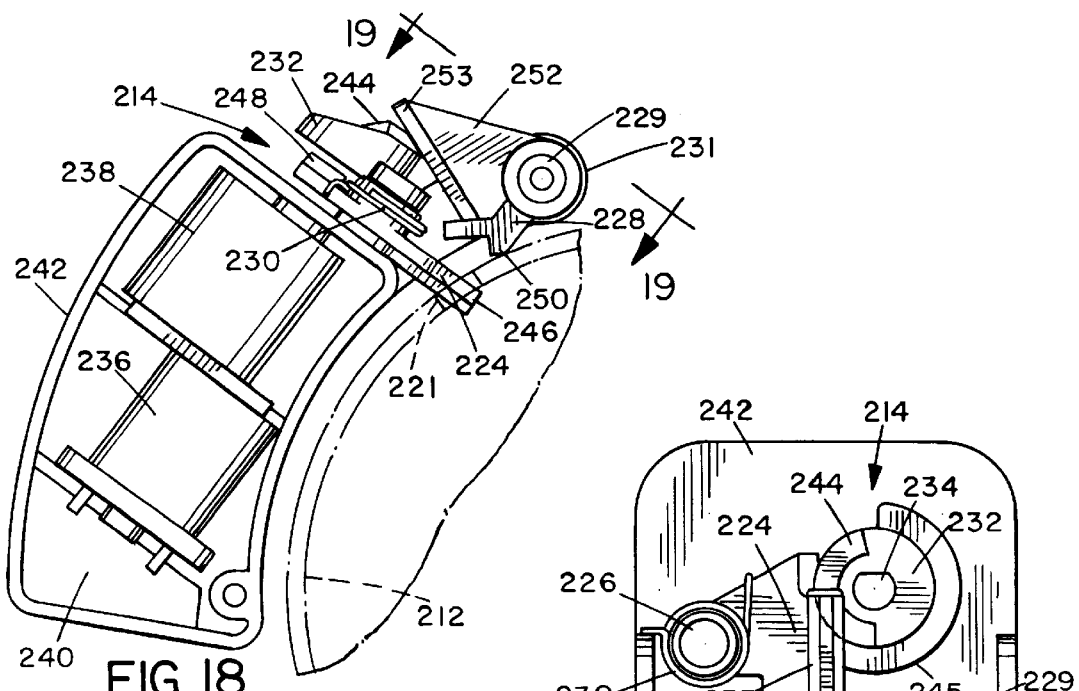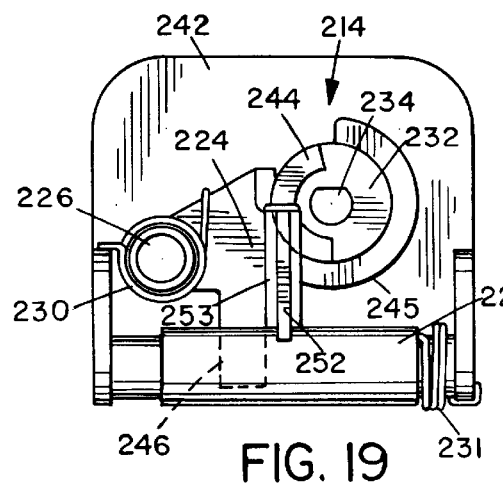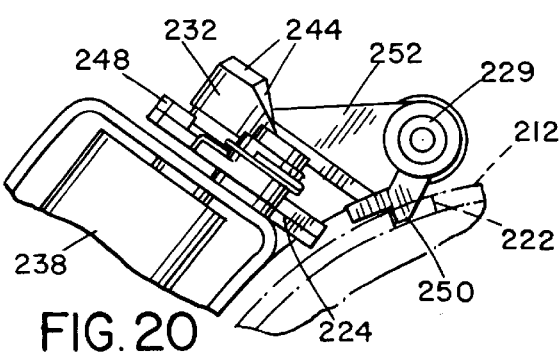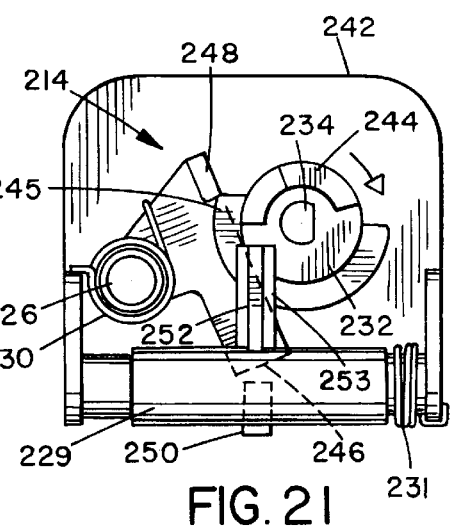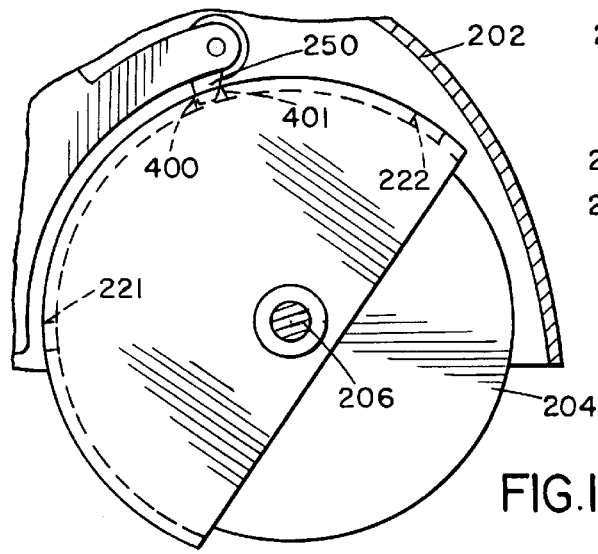

SECURITY APPARATUS AND METHOD FOR SHOPPING CARTS AND THE LIKE

CROSS-REFERENCE TO RELATED APPLICATIONS

This application is a Continuation-In-Part of application Ser. No. 08/843,954 filed Apr. 17, 1997, now U.S. Pat. No. 5,881,846.

BACKGROUND OF THE INVENTION

The present invention relates generally to a security or locking apparatus and method for wheeled vehicles, and is particularly concerned with a locking device for a shopping cart to deter or prevent unauthorized removal of shopping carts from store parking lots.

Wheeled shopping carts are conventionally provided by supermarkets and other large stores for the convenience of shoppers, so that relatively large loads of goods can be collected, paid for, and then wheeled out to the shopper's vehicle for unloading. The empty cart is then collected by store personnel and returned to the store for subsequent use. The problem with this system is that carts are often removed from the store parking lot, for various reasons. One reason for such removal is that a shopper with no vehicle will use the cart to transport goods back to their home, and then often does not return the cart. This can result in permanent loss or theft of the cart. Loss of shopping carts results in very substantial financial loss to the retailer, since each cart is a relatively expensive item.

Numerous proposals have been made in the past for devices to deter shoppers or others from removing carts from the immediate vicinity or parking lot of a store. Such devices typically include some type of wheel locking mechanism which is activated when the cart crosses a boundary of some type around the perimeter of the parking lot or travels a fixed distance from a store exit. Up to now, these devices have had significant disadvantages and have not been adopted to any great extent due to the high cost and disadvantages or problems in implementing them. For example, some mechanisms are highly complex or fragile and liable to failure, breakage or improper operation. Other such mechanisms are too easy to circumvent to be effective. Others are liable to cause damage to the cart wheels or the ground surface when deployed. In other cases, the locking devices are so expensive that they add considerable cost to the carts or high, ongoing maintenance expenses. Another problem with such devices is that store personnel retrieving carts and nesting them together will have no way of knowing which carts have locked wheels. When the resultant "snake" of carts is pushed back to the store, locked wheels slide on the ground and are liable to be damaged.

One prior art locking device is described in U.S. Pat. No. 4,609,075 of Snedeker. This device comprises a ground contacting probe which is deployed by a magnetic triggering assembly when the cart is rolled over a magnetic strip at an outer perimeter of the parking area. The probe contacts the ground and lifts an adjacent cart wheel off the ground, disabling the cart. However, if a person attempts to push the cart at this point, dragging the probe along the ground, damage to the ground surface and probe may occur. Another disadvantage of magnetic devices is that the magnets are very expensive and are not suitable for installation over a wide perimeter.

In U.S. Pat. No. 5,394,962 of Gray, a braking device for a wheeled vehicle includes a braking member which contacts the ground and lifts the vehicle to impede further movement. Again, the device is triggered by a magnet to release a blocking member, allowing the braking member to move into an activated position. Other shopping cart braking devices include stops which extend into openings in one or more wheels, preventing rotation of the wheel. Again, the locked wheel may be dragged along the ground, damaging the tire.

SUMMARY OF THE INVENTION

It is an object of the present invention to provide a new and improved security device for a wheeled vehicle such as a shopping cart, which is reliable and cost-effective in deterring theft or removal of the vehicle or cart from a designated area, such as a store parking lot.

According to one aspect of the present invention, a security apparatus or device for a wheeled vehicle such as a shopping cart having a plurality of caster wheels is provided, which comprises a braking member rotatably mounted on a caster wheel axle for movement between an inoperative or raised position spaced above the ground surface and an operative or lowered position contacting the ground surface, the braking member having a portion projecting radially outwardly beyond the outer peripheral rim of the wheel at least in the operative position so as to separate the wheel from the ground and impede movement of the vehicle. A locking device is provided for releasably locking the braking member in the raised, inoperative position, and a trigger device releases the locking device in response to a trigger signal from a signal system extending around an area in which carts are to be retained. Preferably, the locking device also automatically locks the braking device in the operative or lowered position until it is released by a suitable re-setting device only provided to store personnel.

The braking member may be of any suitable shape providing the necessary projecting portion for raising or separating the wheel from the ground in the operative position, such as an eccentrically mounted disc or partial disc mounted parallel and spaced from one face of the wheel and having at least a portion with larger diameter than the wheel diameter. In a preferred embodiment of the invention, the braking member comprises a part-circular, hollow shell enclosing a portion of the wheel, the shell having an outer, arcuate wall spaced outwardly from the outer peripheral rim of the wheel, and spaced, parallel side walls extending over opposite side faces of the wheel and rotatably mounted on the wheel axle on opposite sides of the wheel. The side walls are sector-shaped and the shell may enclose only a small portion of the wheel or half or more of the wheel.

The locking and trigger devices are preferably mounted within a wheel support yoke adjacent the shell to deter unauthorized tampering with the security apparatus. In a preferred embodiment of the invention, the shell has first and second spaced openings into which a locking device projects in the raised or inoperative position and the operative position, respectively. The locking device may comprise a retractable lock member biased into an advanced position extending into one of the two openings, and the trigger device retracts the locking device out of the first opening when actuated. The retracted locking device may be biased back into the second opening when the shell reaches the operative position, holding the shell in this position to disable the cart. Alternatively, a second lock member may be biased into the second opening when the shell reaches the operative or lowered position.

The trigger device may comprise a switch, a solenoid, or a motor actuated by a suitable boundary device such as a buried perimeter antenna. The shell may be biased into the operative position by a spring or the like, or may be positively driven by a motor from the inoperative or raised position into the operative, lowered position when released.

Since the locking or braking shell completely encloses part of the wheel, it protects the wheel against damage when in the operative, down position, since no action on the part of the person attempting to remove the cart can cause the wheel to drag along the ground. The security device is effective in deterring cart removal while protecting vulnerable caster wheels against damage. The locking shell isolates the mechanical elements of the braking mechanism from the braking forces.

According to another aspect of the present invention, a combined caster and security device is provided, which comprises a wheel supporting yoke, a wheel axle secured to the yoke, a wheel rotatably mounted on the axle, a braking member rotatably mounted on the axle and rotatable relative to the wheel between a raised, inoperative position and lowered, operative position contacting a surface beneath the wheel so as to lift the wheel from the surface and prevent rotation of the wheel on the surface, a locking device mounted inside the yoke, the locking device being movable between an advanced position locking the braking member in the raised, inoperative position, and a retracted position releasing the braking member, and an actuator for moving the locking device into the retracted position in response to movement of the wheel.

The locking device and actuator are preferably mounted within a housing which encloses the shell in the raised, inoperative position, and partially encloses the wheel. The housing may be mounted around an existing wheel supporting yoke, or may be designed to replace a conventional wheel supporting yoke.

In one embodiment of the invention, the actuator comprises a solenoid with a plunger which is extended to retract the locking device away from the braking member, and a sensor in the yoke senses travel of the wheel over a buried antenna around the perimeter of the predetermined area. The locking device is preferably biased into locking engagement with the braking member in the operative position so as to prevent unauthorized release of the shell until it is unlocked by store personnel and returned to the store area. Alternatively, the solenoid plunger may itself comprise the braking device. In another embodiment, the actuator comprises a motor which is switched on to drive a locking latch away from the braking member. The locking device also includes a separate, spring loaded pawl for engaging the braking member in its operative position to prevent release of the braking member by an unauthorized user. The pawl is electronically or mechanically released by store personnel to permit the braking member to be raised, and the motor is then activated in a reverse direction to drive the latch back into locking engagement with the braking member.

According to another aspect of the present invention, a method of impeding movement of a wheeled vehicle outside a predetermined area, is provided comprising the steps of transmitting a trigger signal from a perimeter antenna extending around the perimeter of an area to be protected, providing a braking member on a wheel of a vehicle to be used within the protected area, the braking member being movable between a raised position raised above a ground surface and an operative position contacting the ground surface so as to separate the wheel from the ground and impede movement of the vehicle, releasably latching the braking member in the raised position, detecting the trigger signal if the vehicle is moved to a location adjacent the perimeter antenna, switching a trigger circuit into a high power mode on detection of the trigger signal, operating the trigger circuit to actuate an actuator to release the latch on detection of the trigger signal, whereby the braking member can rotate into the operative position, and switching the trigger circuit back into a low power mode.

Preferably, the method also includes the steps of releasably latching the braking member in the operative position, detecting a release signal from a hand held transmitter, switching the trigger circuit from the low power mode to the high power mode on detection of the release signal, operating the trigger circuit to actuate the actuator to release the braking member on detection of the release signal, whereby the braking member can be returned to the raised position, and switching the trigger circuit back into a low power mode. The trigger circuit is maintained in the high power mode for a predetermined time interval sufficient to release the latch. Preferably, the time interval is approximately one second.

The security apparatus and method of this invention are relatively simple, durable and inexpensive, and the apparatus can be installed on existing shopping cart wheels without requiring modification of the cart. Unlike existing braking devices, the braking member or shell stops the normal movement of the cart and protects the wheel against damage when deployed, as well as reducing the risk of damage to the underlying pavement.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 9 is a view similar to FIG. 2, but showing an alternative security device with a motor driven latch;

FIG. 10 is a left side view of the structure of FIG. 9, with the outer cover cut away;

FIG. 11 is an enlarged view of a portion of FIG. 9, with the device in the locked position;

FIG. 12 is a view of a battery operated resetting probe to reset the motor driven latch;

FIG. 13 is a side elevation view of a caster with a security device according to another embodiment of the invention, illustrating the raised, inoperative position of the shell;

FIG. 14 is a view similar to FIG. 13, illustrating the lowered, operative position of the shell;

FIG. 15 is a section on the lines 15—15 of FIG. 14;

FIG. 17A is a view similar to FIGS. 16 and 17, with the shell in an intermediate locked position;

FIG. 18 is an enlarged view of the lock mechanism with the cover removed, showing the shell inoperative position;

FIG. 19 is a view taken in the direction of arrows 19—19 in FIG. 18;

FIG. 20 is a view similar to a portion of FIG. 18, with the mechanism in the shell operative position;

FIG. 21 is a view similar to FIG. 19, with the mechanism in the position of FIG. 20;

DESCRIPTION OF THE PREFERRED EMBODIMENTS

FIGS. 1–8 of the drawings illustrate a security apparatus for a wheeled vehicle such as a shopping cart according to a first embodiment of the present invention. The security apparatus is integrated with one wheel 10 of a shopping cart so as to disable the wheel if a person attempts to remove the cart from a designated area, such as a store parking lot. A conventional yoke as normally provided on casters is replaced by enlarged yoke or housing 12 for enclosing part of the wheel 10 as well as the security apparatus when in the inoperative, armed position of FIG. 1. The housing 12 has a conventional stem 14 which is secured to a shopping cart body (not illustrated). The caster is preferably a swiveling caster.

Figure 4:
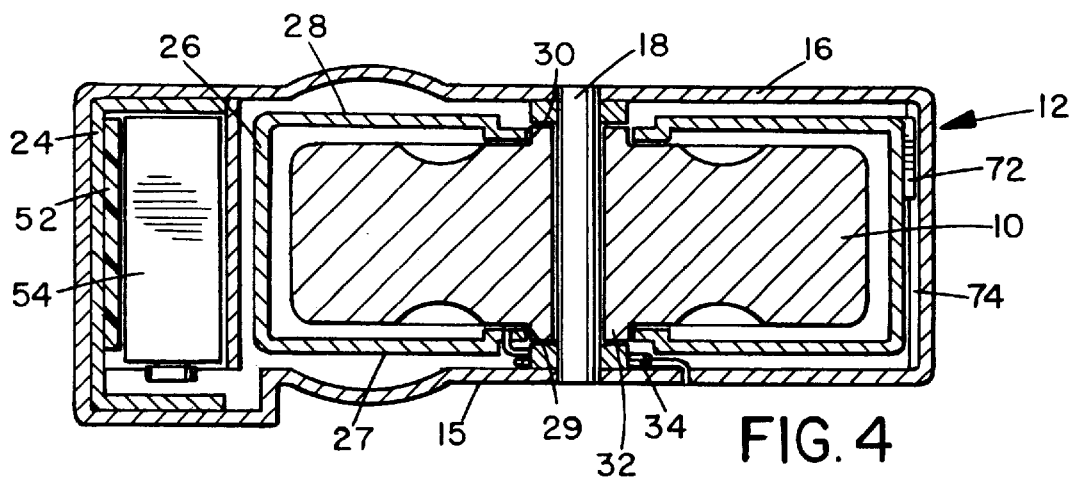
FIG. 4 is a sectional view taken on line 4—4 of FIG. 3.

As best illustrated in FIG. 4, housing 12 has opposite side walls 15,16 extending down on opposite sides of wheel 10. The wheel 10 is rotatably mounted on an axle 18 secured between the housing walls 15,16. The security apparatus basically comprises a braking member or shell 20 rotatably mounted on axle 18 so as to extend over a portion or sector of the wheel 10, a locking device 22 for releasably locking the shell 20 in an inoperative position as in FIG. 1 or an operative position as in FIG. 5, and a triggering module 24 for moving locking device 22 so as to release the shell.

The shell 20, which is preferably of metal or other strong material, has an arcuate wall 26 extending around part of the periphery of wheel 10 but spaced outwardly from the wheel surface so as not to impede its motion when the cart is within the restricted area. A pair of side walls 27, 28 extend from opposite sides of wall 26 on opposite sides of wheel 10 in the space between the wheel and housing side walls 15, 16, as best illustrated in FIG. 4, so that the shell completely encloses part of the wheel. Each side wall 27, 28 is sector-shaped and, in the illustrated embodiment, extends over an angle θ of around 160°. However, it will be understood that the portion of the wheel enclosed by shell may be greater or lesser than that illustrated in the drawings, and may be a sector having an angle in the range from 20° up to 210°.

Figure 3:
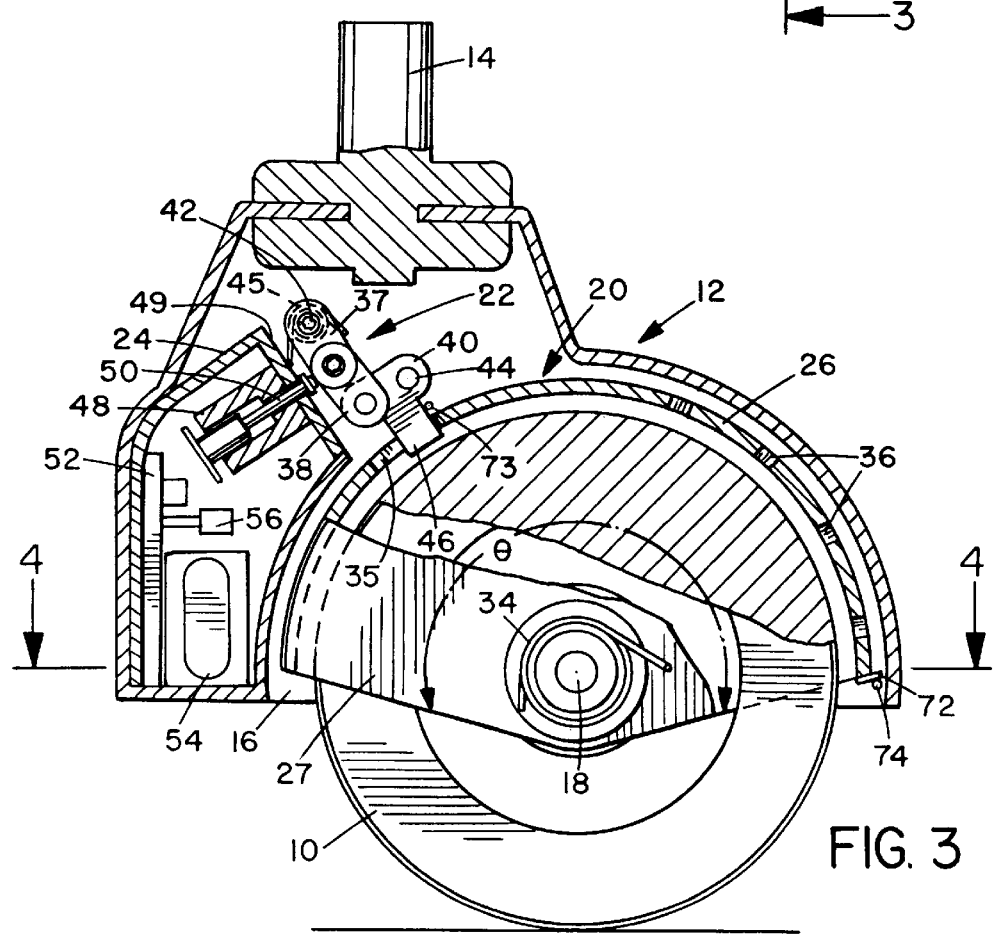
FIG. 3 is an enlarged sectional view taken on line 3—3 of FIG. 2, showing the devices in the armed position.

The walls 27, 28 have aligned openings 29, 30 rotatably mounted over opposing hub portions 32 of the wheel 10. Preferably, a spring 34 is secured at one end to housing side wall 15, extends around the axle 18 and is secured at the opposite end to the shell, as best illustrated in FIGS. 3 and 4, so as to bias the shell in a counterclockwise direction. The arcuate wall 26 of the shell has a series of spaced openings around its periphery, including a larger opening 35 and four spaced smaller openings 36.

Figures 1, 2:
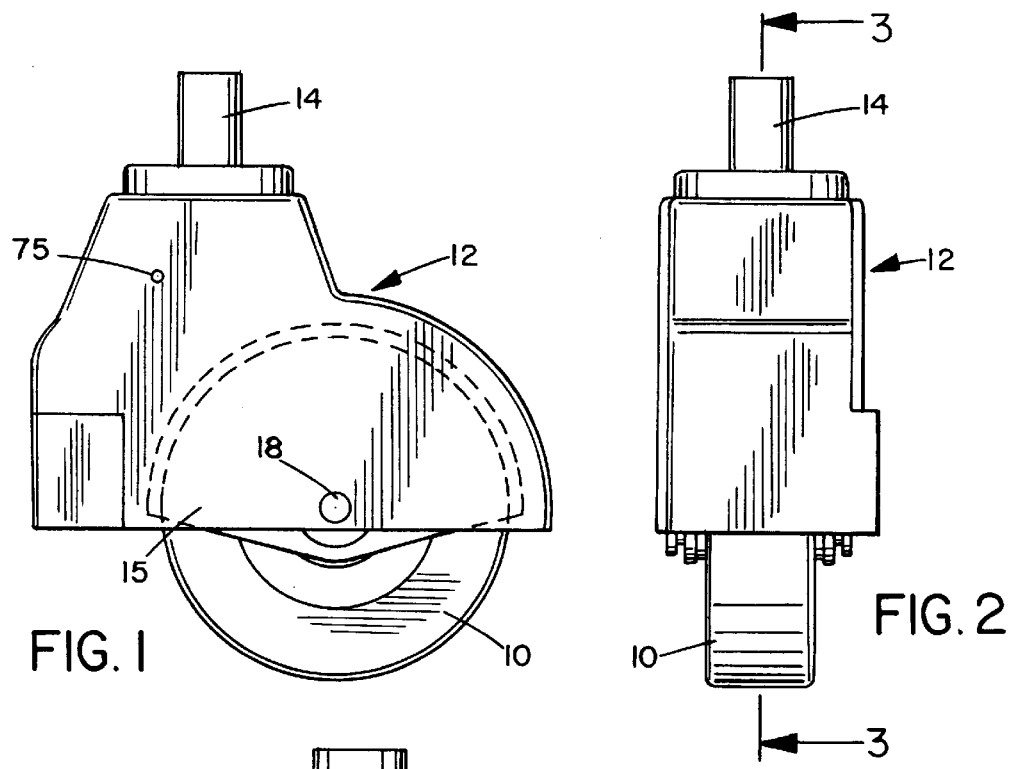
FIG. 1 is a side elevation view of a caster unit with a security device according to a first embodiment of the invention.
FIG. 2 is a view taken from the left side of FIG. 1.

The locking device 22 comprises a three part latch or linkage having a series of three links 37, 38, 40. The outer two links 37 and 40 are pivotally mounted on spaced, fixed pivot pins 42, 44, while center link 38 has opposite ends hinged or pivoted to the outer links. The first link 36 is biased in a counterclockwise direction by latch spring 45. In the armed or inoperative position of FIG. 3, a locking finger or pawl 46 on the third or lowermost link 40 projects into the larger opening 35 in shell wall 26. In this position, the shell is held over the upper half of the wheel 10 and is located within housing 12, as best illustrated in FIG. 1.

Figure 7:
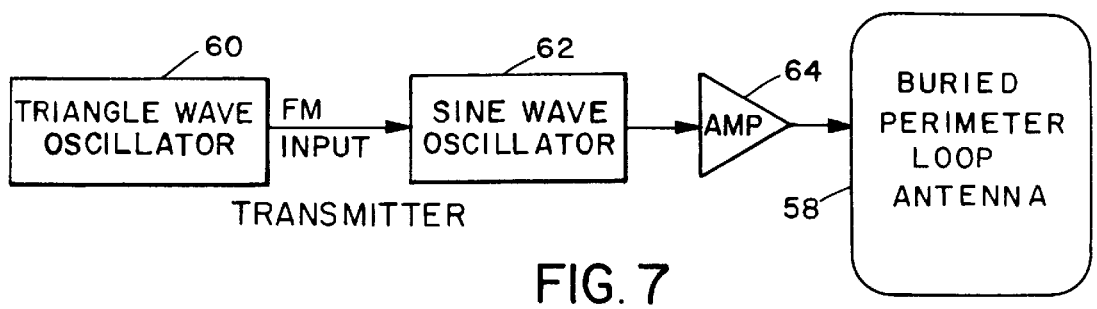
FIG. 7 is a block diagram of the actuating transmitter system.
Figure 8:
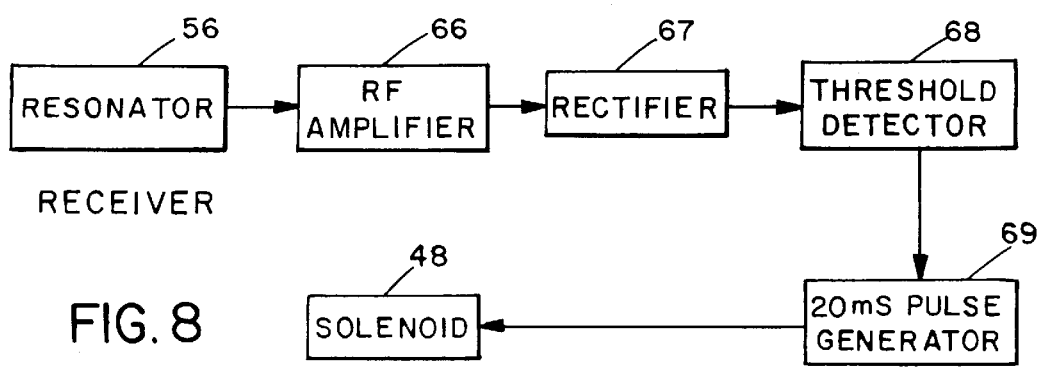
FIG. 8 is a block diagram of the receiver system as installed in the caster.

The actuator module includes an electromechanical actuator such as solenoid 48 secured to an end wall 49 of the module 24 adjacent locking device or linkage 22. Solenoid 48 has a plunger 50 movable between the retracted position of FIG. 3 and the advanced position of FIG. 5. An actuator or receiver circuit is mounted in the module on a printed circuit board 52. The receiver circuit is illustrated in more detail in FIG. 8. A battery power supply 54 operates the actuator circuit. The circuit includes a suitable sensor 56 which detects a signal at the outer perimeter of an area within which the shopping cart is to be kept. In the illustrated embodiment, a buried perimeter loop antenna 58 extends around the perimeter, and is connected to a suitable signal generator as illustrated in FIG. 7. Any suitable signal may be selected which is not liable to interference. In the illustrated embodiment, a triangle wave oscillator 60 is connected to 275 kHz sine wave oscillator 62, and the resultant output is connected via amplifier 64 to the loop antenna 58. It will be understood that other waveforms and frequencies may alternatively be used.

Sensor 56 is designed to detected the output signal of antenna 58 when the shopping cart is close to the antenna. Preferably, sensor 56 comprises a resonator which will resonate at the same frequency as the antenna output signal. The resonator output is connected via RF amplifier 66 and rectifier 67 to a threshold detector 68. If the output is above a predetermined amplitude, a pulse generator 69 is actuated to produce an output pulse which in turn activates solenoid 48 to urge plunger 50 into the extended position of FIG. 5. It will be understood that this is just one example of a suitable circuit for actuating solenoid 48, and other alternative actuators may be used in other embodiments.

Operation of the apparatus will now be described in more detail. During normal use of a cart, the apparatus will be in the armed, inoperative condition of FIGS. 1–3. The latch or locking linkage will be fully extended so that locking pawl 46 extends through opening 35 in the shell and the shell is held in its uppermost position, in which it is raised above the ground and is located almost entirely within the caster housing 12. In this position, the apparatus does not interfere with normal rolling movement of wheel 10 over the floor or ground.

If a user attempts to roll the cart over the buried loop antenna 58 out of the parking lot or other restricted area, the antenna signal will be picked up by sensor or resonator 56, in turn actuating the pulse generator 69 to emit a single pulse. This pulse energizes the solenoid 48 to drive plunger 50 into the extended position of FIG. 5. As the plunger is driven outwardly, it pushes the pivot connection between links 37 and 38 outwardly, collapsing the linkage and simultaneously raising pawl 46 out of opening 35. As soon as the pawl is free of the opening, the shell 20 will rotate downwardly, under the action of biasing spring 34, in the direction of the arrow in FIG. 5. This rotation continues until the shell contacts the ground. After the shell contacts the ground, continued forward motion of the cart will move the shell into the braking position, lifting wheel 10 up off the ground. As the shell rotates, the pawl 46 has a ratcheting action in ratchet openings 36, so that the shell cannot be rotated back in the opposite direction to render it inoperative. A suitable stop device is provided for preventing rotation of the shell beyond the point illustrated in FIG. 5 and 6, for example a stop 72 on the end of shell 20 which engages pin 73 on the shell when the shell reaches the lowermost position, as indicated in FIG. 6. Clearly, pin 73 may comprise any suitable stop mechanism. At this position, pawl 46 projects partially into the final ratchet opening 36 and prevents clockwise movement of the shell, while pin 73 in the housing prevents further movement in a counterclockwise direction. The pawl 46 acts both as the locking member for holding the shell in the raised, inoperative position and the operative position, and as the pawl for ratcheting engagement in openings 36.

Figure 5:
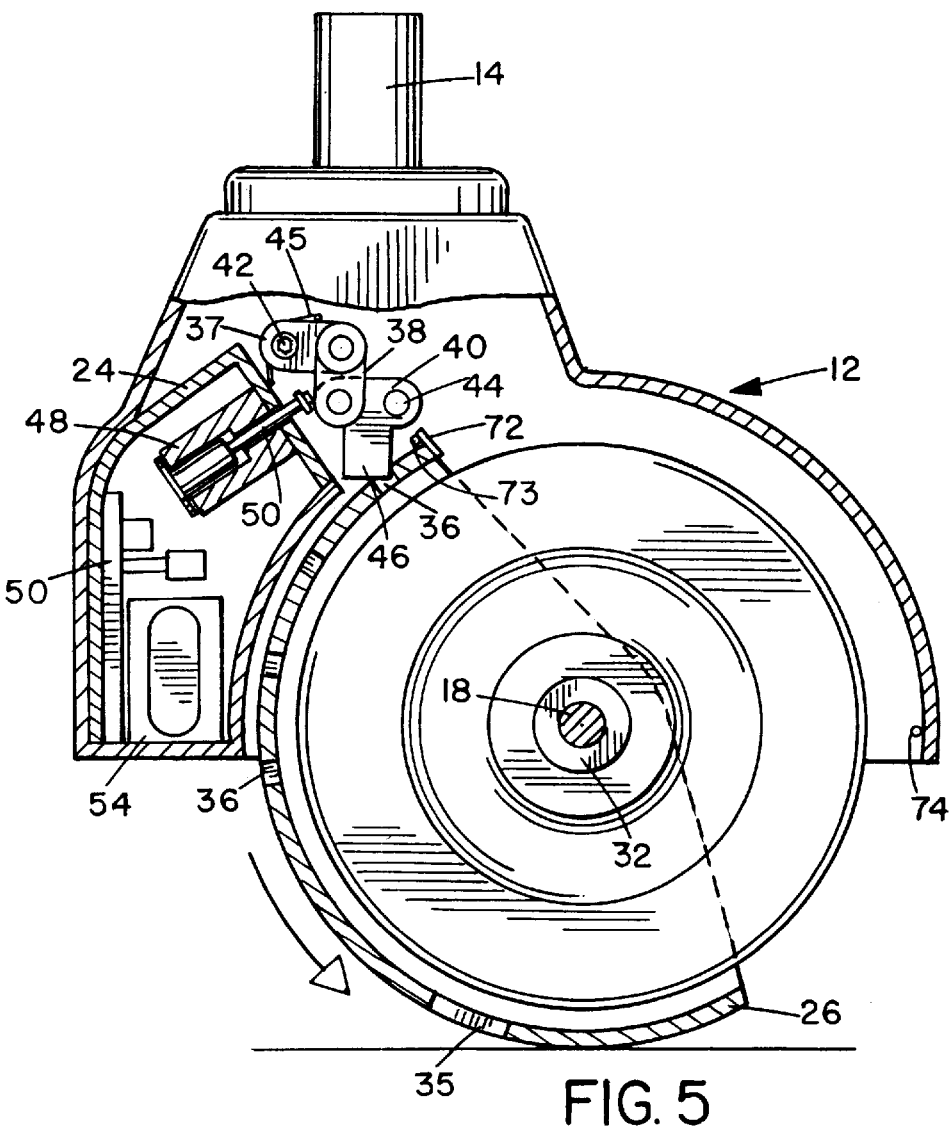
FIG. 5 is a view similar to FIG. 3, with the device in the actuated position.
Figure 6:
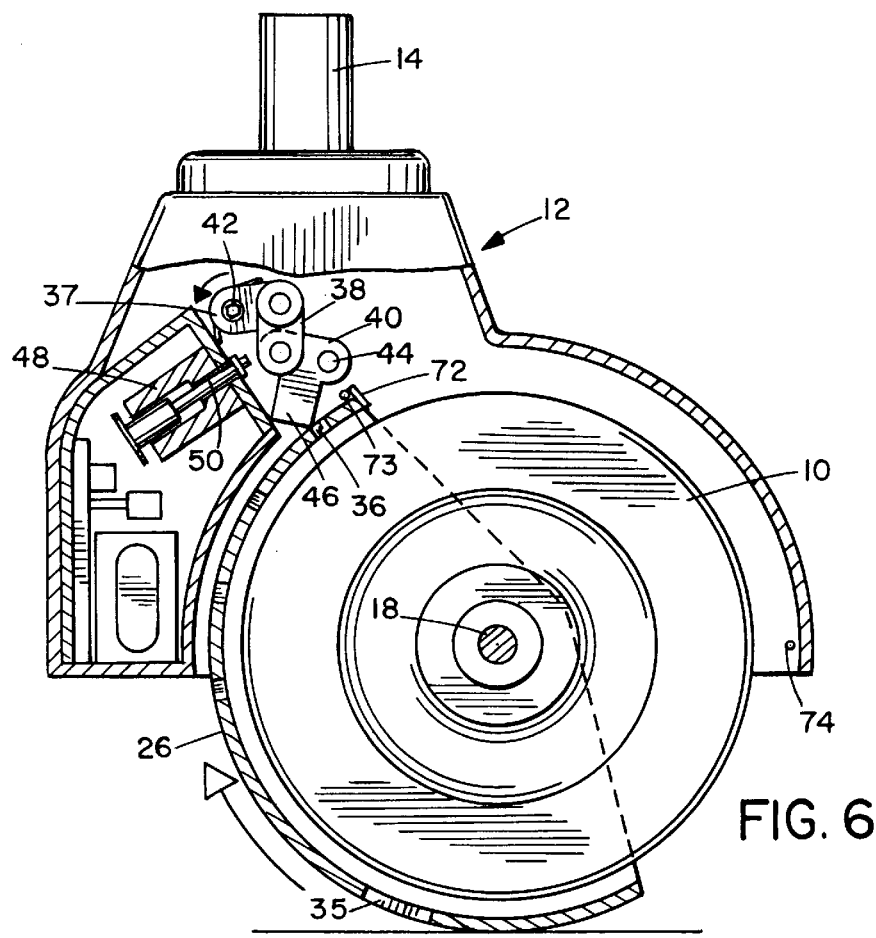
FIG. 6 is a view similar to FIG. 5, with the device in the reset position.

The wheel 10 can no longer roll along the ground when the shell is in the actuated position of FIG. 5, and motion of the cart is impeded. At the same time, the shell partially encloses the wheel and shields it from the ground, so that the wheel does not become damaged in the event that the cart user attempts to push the cart on three wheels. The shell also reduces the risk of damage to the pavement, since the arcuate wall can slide along the ground without unduly damaging it. This system will deter people from removing protected carts from a store parking lot, due to the difficulty of moving a cart when one of the wheels is disabled as illustrated in FIG. 5. The user cannot tamper with the locking apparatus or attempt to disable it, since the apparatus is enclosed within the housing 12, and the actuator circuit and solenoid are also enclosed within a module housing which also blocks access to the locking linkage.

When the shopping cart is retrieved for return to the store, store personnel can readily deactivate the locking mechanism using a special key. An access hole 75 in caster housing 12 provides access to a key hole 76 in the upper locking link 37. The key hole 76 may be of any suitable key shape, such as hexagonal. The key shank (not illustrated) is suitably shaped for keying engagement in hole 76. Once engaged, the key is rotated in the direction of the arrow in FIG. 6, rotating link 37 downwardly and simultaneously raising link 38 and 40, and raising pawl 46 out of opening 36. At this point, the shell can be manually rotated back up into the housing, as indicated by the arrow in FIG. 6, until stop 72 engages a second limit pin 74. The key is removed from key hole 76, releasing link 37. The link 37 is then biased back in the opposite direction by spring 45. As soon as the opening 35 moves back into alignment with pawl 46, the linkage will snap back into the extended position of FIG. 3 under the action of spring 45, simultaneously pushing the solenoid plunger 50 back into the retracted position, and locking the shell in the raised position to permit normal travel of the cart.

Since the locking shell completely encloses a portion of the wheel when deployed, it will protect the wheel against damage if a person attempts to roll the cart when the wheel is disabled. It also restricts individuals from attempting to tamper with the locking mechanism, as they may otherwise be tempted to do if the mechanism is partially exposed. The shell can only be released and moved back into the inoperative position by an individual with the appropriate key, so that unauthorized individuals will be unable to release the lock and would be unaware of how such a release can be done. The apparatus does not require major redesign of an entire caster, but simply requires replacement of an existing caster with the assembly as illustrated in FIGS. 1–6. The wheel 10 is preferably smaller than a conventional wheel of a caster, to provide the space necessary to mount shell 20.

Preferably, wheel 10 has a 4-inch diameter, rather than a conventional 5-inch diameter. Thus, existing carts can readily be modified to incorporate the security or locking apparatus.

FIGS. 1–6 illustrate one example of a suitable actuator and locking device for locking the shell 20 in its retracted and operative positions. In this embodiment, the locking latch is actuated by a solenoid. However, in alternative embodiments, the solenoid plunger itself may be the locking member and engage directly in the shell openings. Also, although the shell has openings for receiving the locking device and pawl in the illustrated embodiment, other possible formations may be used, such as recesses, projections, teeth, or the like, for engaging with a suitable lock member.

FIGS. 9–11 illustrate an alternative embodiment in which the locking device is actuated by a motor. Also in the embodiment of FIGS. 1–6, a custom housing 12 is used to replace the conventional yoke provided in a conventional caster. In the embodiment of FIGS. 9-11, the wheel 80 is rotatably mounted on a conventional style yoke 81 via axle 82, and the actuator and locking mechanism are mounted in a separate, clam shell housing 84 which clamps over the yoke 81. Housing or fairing 84 may be of injection molded plastic material, molded in two halves which clamp around the yoke 81 and snap together or are fastened together in any suitable manner. With this arrangement, the security device can be simply mounted on top of the existing yoke of a conventional caster.

It will be understood that a clam shell housing similar to housing 84 may alternatively be used to house the security mechanism of the previous embodiment, instead of the custom housing 12 illustrated which replaces the conventional yoke. Similarly, a custom housing may be used in this embodiment instead of conventional yoke 81 and clam shell housing 84.

As in the previous embodiment, a shell 85 is rotatably mounted on axle 82 between the wheel and the housing 84. The shell 85 is of metal or other strong material, and has an arcuate wall 86 extending around slightly less than half of the outer periphery of the wheel, with a width greater than the wheel width, and opposite side walls 87, 88 extending down on opposite sides of the wheel and rotatably mounted on axle 82. Each side wall is sector-shaped and has a radius slightly greater than the wheel diameter, spacing arcuate wall 86 from the wheel rim. Thus, shell 85 completely encloses part of the wheel, as in the previous embodiment. The shell outer wall 86 has a series of spaced latch openings 89 around its periphery.

A latch member 90 is pivotally supported on pin 92 and is connected via link 93 to a lead screw 94 driven by motor 95. When the shell 85 is in the uppermost, retracted position, the latch member 90 is driven into its operative position engaging in the lowermost opening 89 to lock the shell in position during normal operation of the cart, as illustrated in FIG. 9. A separate pawl 96 is rotatably mounted on pin 92 adjacent the latch member 90, as best illustrated in FIGS. 10 and 11. Pawl 96 is biased by spring 97 towards the shell 85, so that it rides against the outer surface of the shell.

The motor 95 may be actuated in a similar manner to solenoid 48 of the previous embodiment, as described above in connection with FIGS. 7 and 8, and the same basic transmitter and receiver system may be used. However, the pulse generator 69 preferably has a 450 mS cycle, rather than 20 mS as was used for the solenoid embodiment. A suitable battery 110 is mounted in the housing 84 for operating motor 95, for example as illustrated in FIG. 10. The control circuit for operating motor 95 is preferably the same as that illustrated in FIG. 8 for the solenoid, as mentioned previously. Thus, a suitable signal is detected by a receiver which in turn switches the motor on for a sufficient length of time to retract the latch member. Alternatively, the motor may be turned off by means of a limit switch.

Once actuated, the motor drives screw 94 to rotate so as to retract nut 97 to which the link 93 is coupled. This acts to rotate latch member 90 upwardly out of the opening, releasing the shell. The motor is then switched off, holding the latch member in the retracted position. The shell is then free to rotate downwardly into an operative position in which it is in contact with the ground surface and raises the wheel above the ground, in an equivalent position to shell 20 in FIG. 5 of the previous embodiment. In this position, the pawl 96 is urged by spring 97 into the uppermost latch opening 89, as indicated in FIG. 11, preventing rotation of the shell in a clockwise direction back towards the inoperative position. A stop 98 on shell 85 engages a pin 99 on the motor supporting plate in this position, as illustrated in FIG. 11, to prevent further rotation of the shell in a counterclockwise direction beyond the locked, operative position of FIG. 11. Stop 98 engages a second limit pin 111 on the housing when the shell reaches the retracted or inoperative position of FIG. 9. It will be understood that stop pins 99 and 111 may be replaced with any alternative stop configuration and need not be pins.

As in the previous embodiment, when the shell is locked in the operative position of FIG. 11, where the shell engages the ground and continued forward motion of the cart lifts the wheel 80 off the ground, it will be impossible to push the cart and make it travel over the ground in a normal manner. Thus, if a user attempts to exit the designated area with the cart, the motor is actuated to release the latch member, and the shell will roll down to raise the wheel and render it inoperative, as in the first embodiment. As the shell rotates down, the pawl 96 will travel over the surface of the shell and engage in successive openings 89 in a ratcheting manner, preventing any attempt to rotate the shell back in the opposite direction after release of the latch member.

FIG. 12 illustrates a possible resetting unit 100 for resetting the shell and latch when the cart is returned to the designated area. Unit 100 has a pair of projecting electrical probes 102 which engage corresponding probes 103 on the motor when the device is inserted through a suitable opening (not illustrated) in the housing 84. Probes 102 are activated by suitable batteries 104, and a button (not illustrated) will be provided on the unit 100 so that the user can activate the probes at the appropriate time. In order to reset the security device of FIGS. 9–11 when the shell is in the position illustrated in FIG. 11, the pawl 96 must first be lifted out of opening 89 to permit the shell to be manually rotated back into the inoperative position of FIG. 9. This may be done by a suitable mechanical key or the like, as described in connection with the previous embodiment. Once the pawl 96 has been released, the operator rotates the shell back upwardly and into the housing 84, until it reaches the position illustrated in FIG. 9, where stop 98 engages limit pin 111, preventing rotation beyond the position illustrated in FIG. 9. Once the stop pin is reached, the operator holds the shell up while inserting the probes 102 to touch motor contacts 103. The unit 100 is then activated, which in turn activates battery 95 to drive the screw 94 back in the opposite direction, rotating latch member 90 back into the lowermost opening 89, until the position illustrated in FIG. 9 is reached. The motor then turns off again.

Suitable switches, timing circuits or motor limit switches (not illustrated) are provided for switching the motor off when the latch member 90 reaches the retracted position of FIG. 11 and the operative position of FIG. 9, respectively. The motor actuator of FIGS. 9–11 is preferred over the solenoid actuated version of FIGS. 1–6, since the motor will require less power to operate than the solenoid, and will be less likely to be subject to false triggering. However, both versions will be equally effective.

FIGS. 13–15 illustrate a caster unit 120 with a security device or mechanism according to another embodiment of the invention for impeding movement of a shopping cart if a user attempts to remove the cart from a designated area. The unit 120 includes an outer yoke or housing 122 which encloses part of wheel 124 as well as the security device in the armed, inoperative position of FIG. 13. Wheel 124 is rotatably mounted on axle 126 which is secured between opposite side walls 127 of the housing 122.

The security apparatus in this embodiment basically comprises a braking member or shell 128 which has opposite side walls 129 extending over opposite side faces of the wheel and rotatably supported on axle 126, as in the previous embodiments, and as illustrated in FIG. 15. A curved or arcuate outer wall 130 of the shell extends around part of the periphery of the wheel but is spaced outwardly from the wheel rim so as to not impede normal rotation of the wheel when the security device is not actuated, as in the previous embodiments. Again, although the shell extends over an angle of around 180° in the illustrated embodiment, the sector angle enclosed by the shell may be greater or less than that illustrated, and any sector angle in the range from 20° to 210° may alternatively be used.

The latching mechanism for releasably securing the shell in the raised or inoperative position of FIG. 13 is similar to that of FIGS. 9–12 although it is oriented in the opposite direction. As in the previous embodiment, a latch member 132 is pivotally mounted on pin 134 and is linked via nut 135 to a lead screw 136 driven by motor 138 so as to move between the latched position of FIG. 13 and the released position of FIG. 14. The arcuate wall 130 of the shell has a first opening, recess or the like 139 positioned to receive a latch finger 140 on latch member 132 when the shell is in the raised, inoperative position, as illustrated in FIG. 13.

A spring loaded pawl 142 is also pivotally mounted in the housing 122 above the latch member via pivot pin 143, and is biased by spring 144 against the shell wall 130, as best illustrated in FIG. 15. The wall 130 has a series of ratchet openings 145 for ratcheting engagement with pawl 142 as the shell moves between the inoperative position of FIG. 13 and the actuated position of FIG. 14.

The motor 138 may be actuated in a similar manner to the solenoid of the first embodiment and the motor of the second embodiment described above, as illustrated in FIGS. 7 and 8. A suitable perimeter transmitter, such as that illustrated in FIG. 7, emits a signal which is detected by the receiver of FIG. 8 in order to switch on motor 138 for a predetermined time period sufficient to retract finger 140 from opening 139. The screw 136 is rotated in order to drive nut outwardly away from the motor housing, simultaneously rotating latch member 132 in a clockwise direction, retracting finger 140 from opening 139. Once the finger is retracted, the shell 128 is free to rotated downward in a counterclockwise direction in which it is contact with the ground surface and raises the wheel from the ground, in a similar manner to the previous embodiments.

As the shell rotates down, pawl 142 will ride over wall 130 and engage in ratchet openings 145 to prevent movement of the shell back in a clockwise direction. The housing side walls 127 each have an in-turned tab 146 along their respective lower edges. The tabs act as stops for the shell when it reaches the actuated position of FIG. 14, where the lower edges of the shell side walls 129 abut against the stop tabs 146. In this position, pawl 142 engages in the last of the three ratchet openings, preventing retraction of the shell from the actuated position. Thus, the shell is effectively locked against rotation in either direction when it reaches the position of FIG. 14.

When the shell touches the ground as it deploys, continued forward motion of the cart lifts the wheel off the ground and impedes further movement of the cart without dragging the shell along the ground. This makes it difficult to push the cart outside the designated boundary, which is normally the edge of the store parking lot. As in the previous embodiments, the deployment of the shell, which occurs automatically when a user attempts to leave the designated area, will provide a significant deterrence to theft of carts and will be very difficult to circumvent.

A suitable reset device 148 is provided for use by store personnel to reset the shell in the armed, inoperative position when an abandoned, locked cart is collected. When the shell is in the deployed, actuated position of FIG. 14, the latch member is retracted and the motor is off, and the pawl 142 is engaged in the last of the ratchet openings 145. The reset device 148 is a battery operated wand which acts to lift the pawl out of opening 145 so that the shell can be manually rotated back into the inoperative position of FIG. 13, and also actuates the motor to drive the latch member back down so that finger 140 again engages in opening 139.

Device 148 has a handle portion 149 which holds battery 150, and first and second contact probes 151, 152 projecting from the handle portion 149. The first contact probe 151 also comprises a lifting member with a tapered lifting edge 153. One side wall 127 of the housing 122 is provided with a first opening 154 for receiving contact probe 151, and a second opening 155 for receiving the second contact probe 152, as illustrated in FIG. 15. A contact 156 within the housing is aligned with opening 155 and is suitably connected to the motor. A second contact (not illustrated) is arranged to contact lifting probe 151 as the probe is inserted into the housing. The handle portion has a suitable power switch (not illustrated) for connecting the battery to the contacts.

In order to return the shell to the inoperative position, the operator simply inserts contact probe 151 through opening 154 and contact probe 152 through opening 155. Opening 154 is suitably aligned with the pawl 142 so that the tapered lifting edge 153 will contact the lower edge 158 of the pawl, and lift the pawl completely out of opening 145 when the probe is fully inserted. At the same time, contact probe 152 will touch contact 156 inside the housing, and the probe 151 will touch another motor actuating contact. The operator now manually rotates the shell back up into the housing until the lower edges of the shell again reach the stop tabs 146. At this point, the latch opening 139 will again be aligned with the latch finger. The operator switches on the reset device, which turns on the motor to rotate the screw 136 in the opposite direction, moving nut 135 back towards the motor housing and simultaneously rotating the latch member in a counterclockwise direction so that finger 140 again engages in opening 139 to lock the shell in its raised position, where normal movement of the cart will not be impeded.

Figure 22:
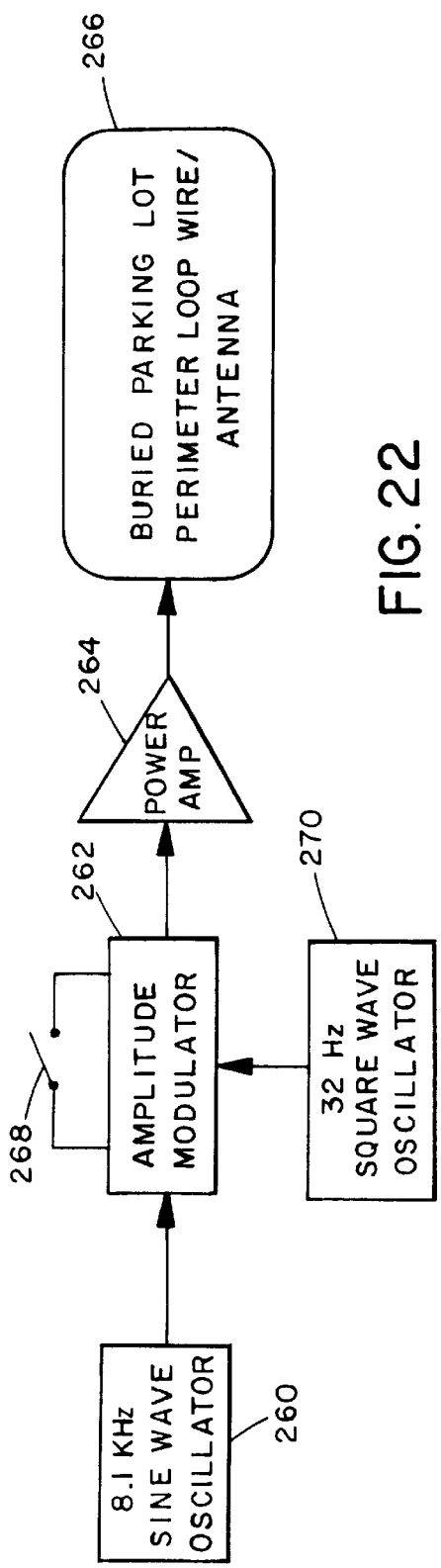
FIG. 22 is a block diagram of the transmitter circuit for FIGS. 16–21.
Figure 23:
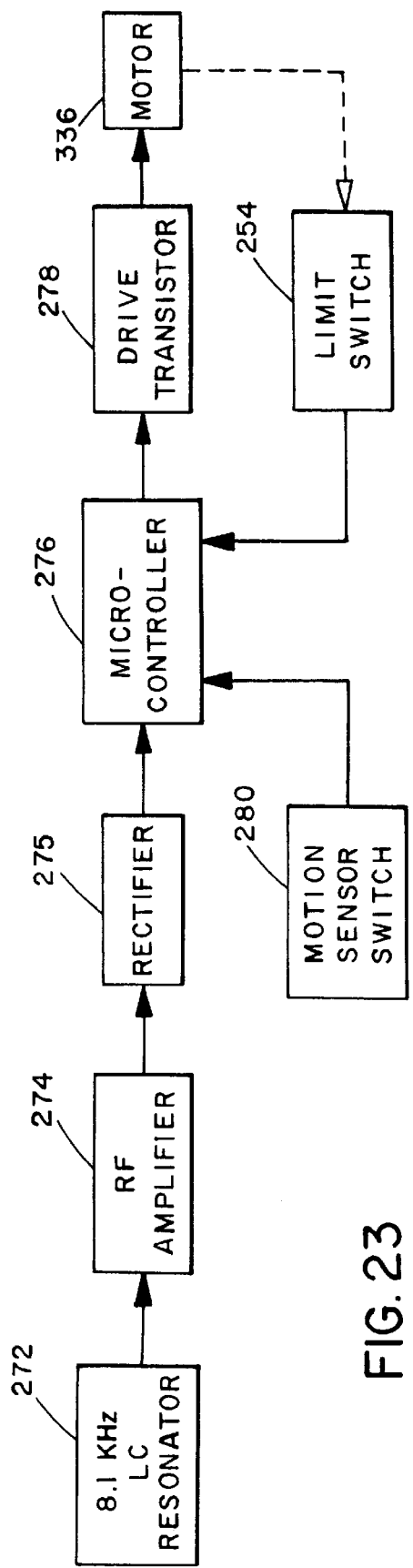
FIG. 23 is a block diagram of the associated receiver circuit.

FIGS. 16 to 21 illustrate a caster unit 200 with a security device or apparatus 210 according to another embodiment of the invention. As in the previous embodiments, the security device will impede movement of a shopping cart if a user attempts to remove the cart from a designated area. FIG. 22 illustrates a transmitter circuit for actuating the security device, while FIG. 23 illustrates a receiver unit in the security device for operating the device to brake the cart on receipt of a designated signal from the transmitter circuit of FIG. 22, as will be explained in more detail below.

Figure 16:
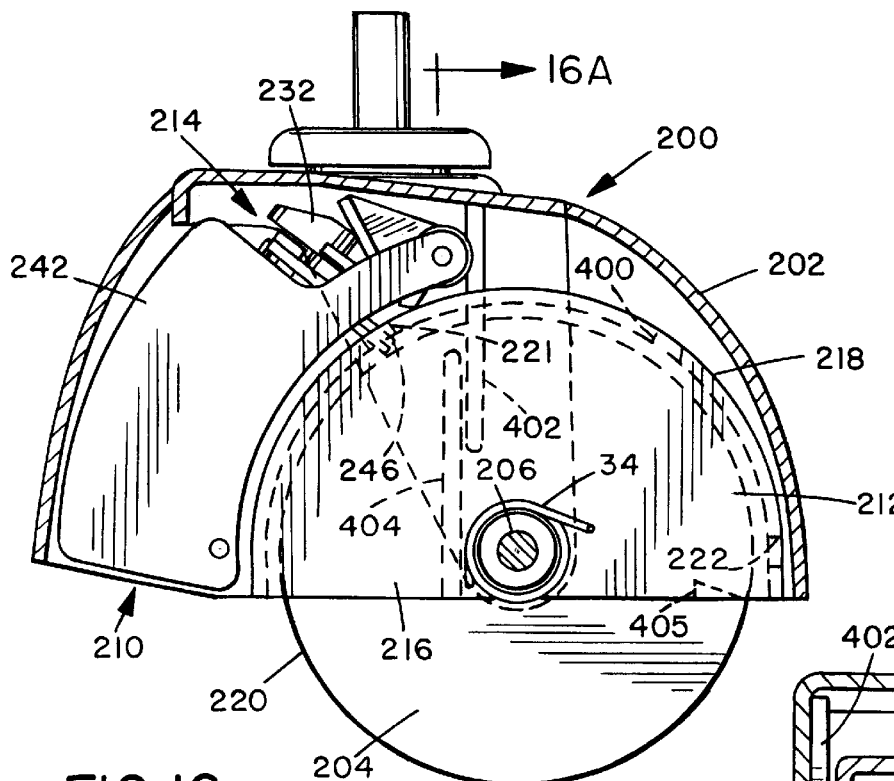
FIG. 16 is a side view, with the near side removed, of a further motor driven configuration.

The caster unit 200 includes an outer yoke or housing 202 of plastic, composite, or metal material enclosing part of wheel 204 as well as the security device 210 when it is in the armed, inoperative position as illustrated in FIG. 16. Wheel 204 is rotatably mounted on axle 206 which is secured between the opposite side walls of housing 202.

Figure 17:
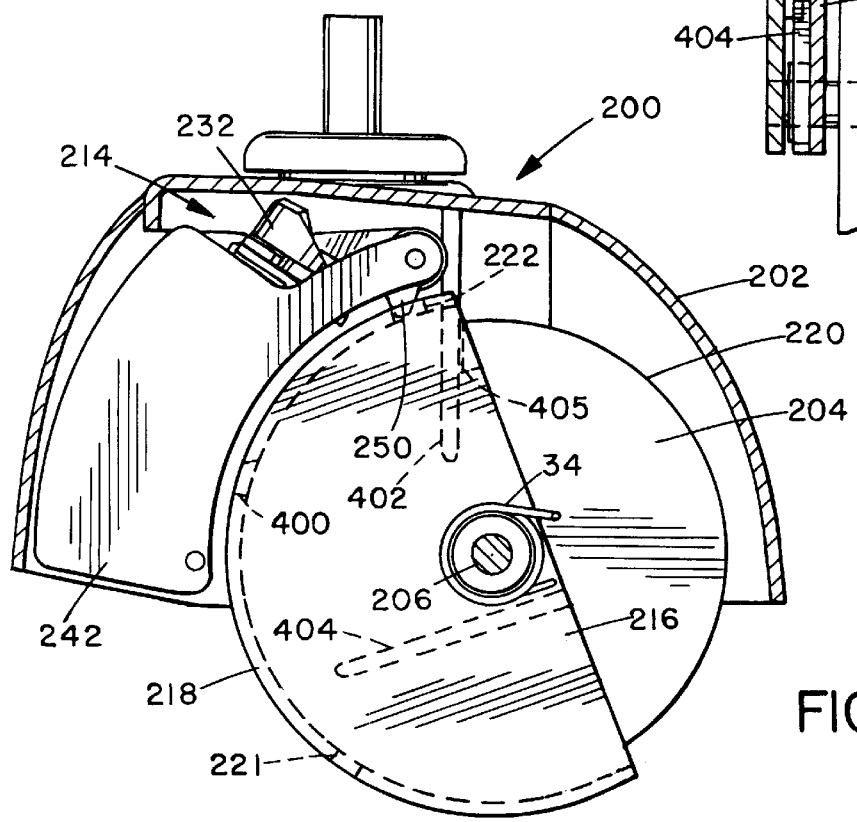
FIG. 17 is a view similar to FIG. 16, with the shell in locked position.

The security unit 210 basically comprises a braking member or shell 212 similar to the shell of the previous embodiments, and a latching or locking assembly 214 for releasably locking the shell either in the inoperative position of FIG. 16 or the operative position of FIG. 17. The shell 212 has a pair of spaced, parallel side walls 216 each of approximately semi-circular shape, and a curved or arcuate outer wall 218 which extends between the outer edges of the side walls and has a diameter larger than that of the wheel 204. The side walls are rotatably supported on axle 206 so that the arcuate wall 218 is spaced radially outwardly from the outer rim 220 of the wheel, as illustrated in FIGS. 16 and 17. The shell may be of metal, plastic, or composite material. The arcuate wall 208 of the shell has three spaced openings 221, 222, 400 defining the inoperative position and two possible braking positions of the shell, respectively.

The locking assembly 214 is illustrated in more detail in FIGS. 18 to 21. The assembly 214 includes a first locking member or pawl 224 rotatably mounted on axle or pivot pin 226 and a second locking member or latch 228 rotatably mounted on a second axle or pivot pin 229 adjacent the first locking member 224. Both locking members are biased by springs 230, 231, respectively, against the shell. A cam 232 is mounted on a drive shaft 234 for controlling movement of each locking member between the advanced position in which it engages a respective opening 221, 222 in the shell and a retracted position in which it is held away from the shell.

Drive shaft 234 and cam 232 are rotated in order to retract the respective locking members by means of a motor 236 and reducing gear assembly 238. Operation of the motor 236 to rotate the cam 232 is controlled by a receiver circuit 240 which is illustrated in more detail in FIG. 23. A suitable perimeter transmitter as illustrated in FIG. 22 emits a signal detected by the receiver circuit 240 in order to switch on the motor 236 for an appropriate time period determined by a limit switch 254. The receiver circuit or printed circuit board 240, power supply, motor and gear box 238 are all preferably mounted in a sealed, waterproof housing 242, as illustrated in FIG. 18, which reduces the risk of water or moisture damaging the circuitry and potentially causing a malfunction. An 0-ring seal (not illustrated) may be provided on the drive shaft 234 to seal the opening in housing 242 through which the drive shaft extends.

As best illustrated in FIGS. 18 to 20, the cam 232 is a generally annular or ring-shaped member having a cam surface with a raised portion 244 facing the second locking member 228 and a radially outwardly projecting cam tab or finger 245. The first locking member 224 includes a locking finger 246 for engagement in opening 221 and a projection 248 for engagement with the cam tab 245 projecting outwardly from cam 232. The second locking member 228 includes a locking projection 250 for engagement in opening 222 in the shell, and an arm 252 having a rim or flange 253 for engagement by tapered cam surface 244 to control retraction of locking projection 250 out of opening 222, as explained in more detail below.

In the inoperative, armed position of FIG. 16, the locking finger 246 of pawl 224 engages in the first opening 221 in the shell to hold the shell up inside yoke 202. When a suitable signal is received from the perimeter transmitter, the motor is switched on to rotate the cam 232 in a clockwise direction from the position illustrated in FIGS. 18 and 19 to the position illustrated in FIG. 21. As the cam rotates, the cam tab 245 engages the projection 248 on the first locking member to lift the locking finger out of opening 221 as the cam rotates through 180° from the position in FIG. 19, as indicated in FIG. 21. This allows the shell to rotate down into the operative or braking position of FIG. 17, in which the shell contacts the ground, causing the wheel to lift off the ground in the same way as in the previous embodiments. At the same time, cam surface 244 is rotated away from the rim 253 of the second locking member. The tab 245 holds the locking finger 246 away from the shell until tab 245 is rotated clear of projection 248. This deters any attempt to reset the shell prior to locking of the shell in the lowered, operative position.

As the shell rotates down, the locking projection or portion 250 of the second locking member rides against the shell and is biased against the shell by spring 231. Once the portion 250 is aligned with the second opening 222, it will be biased into the extended position illustrated in FIGS. 17, 20 and 21 in which the locking portion 250 engages in the opening 222 to lock the shell in the operative position. Limit switch 254 (see FIG. 23) is arranged to turn off the motor when the cam is rotated to the position illustrated in FIG. 21, holding the first locking member in the retracted or raised position.

In case the cart should stop as soon as the shell touches the ground, in the position illustrated in FIG. 17A, a third opening 400 is provided in the shell between the openings 221, 222 and positioned such that it is aligned with the locking portion 250 when the shell is in the illustrated position. If the shell stops in this position, the portion 250 engages in the opening to lock the shell against rotation in a clockwise direction back up into the housing, which could otherwise circumvent the security system. However, if the shell does not stop in this position but continues to rotate down into the position illustrated in FIG. 17, the portion 250 is able to ratchet out of opening 400, due to the canted side wall 401, and around the shell until the opening 222 is engaged, as illustrated in FIG. 17. This arrangement avoids the risk of someone circumventing the braking system by stopping the cart when the shell first touches the ground and then rotating the shell back up into the housing.

Figure 16A:
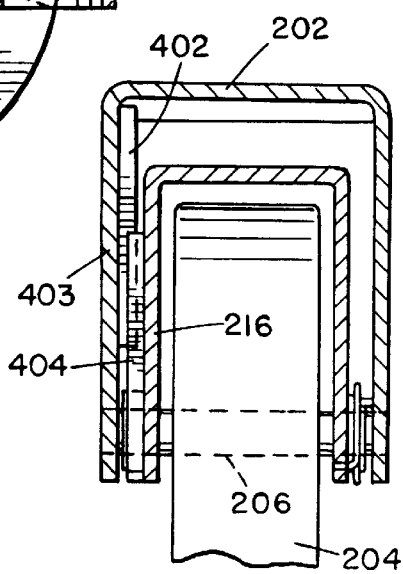
FIG. 16A is a cross-section on the lines 16A—16A of FIG. 16.

Stop surfaces are provided between the shell 212 and housing 202 to prevent the shell from being rotated on beyond the latched, operative position of FIG. 17 or back past the raised, inoperative position of FIG. 16. As illustrated in FIGS. 16 and 16A, an internal rib 402 is provided on one side wall 403 wall of the housing, and a co-operating rib 404 is provided on the outer face of one side wall 216 of the shell. When the shell is rotated in a clockwise direction into the inoperative position of FIG. 16, rib 404 engages the rib 402 to prevent further rotation of the shell beyond this position, and to ensure that the locking finger 246 is properly aligned for engagement in opening 221.

A second stop formation or tab 405 is provided on the inside of side wall 216 to engage the opposite side of stop rib 402 when the shell is rotated in a clockwise direction into the operative position, as illustrated in FIG. 17. When the shell is stopped in this position, locking portion 250 will be aligned for engagement in opening 222 as illustrated.

When the cart is recovered and an operator wishes to unlock the shell and return it to its inoperative position, a hand held transmitter substantially identical in function to that illustrated in FIG. 22 is actuated to emit a signal which again actuates the motor 236 to continue to rotate the cam back into the position illustrated in FIG. 19 (i.e. through 180°). As the cam rotates, the raised portion 244 of the cam surface contacts the arm 252 on the second locking member, lifting the locking member up until the portion 250 is retracted out of the opening 222, and holding the locking member in the retracted position of FIGS. 18 and 19. The limit switch then turns off the motor to leave the cam in this position until and unless it is actuated again by a perimeter transmitter. At this point, the operator is free to rotate the shell back up into the inoperative position of FIG. 16. At the same time, the tab 245 is rotated away from projection 248, releasing the first locking member so that it is again biased against the shell. As soon as opening 221 reaches the locking finger 246, the finger will drop back into the opening, again locking the shell in the raised position.

The transmitter and receiver circuits will now be described in more detail with reference to FIGS. 22 and 23. The perimeter transmitter and hand held transmitter circuits will be substantially identical in function. Each transmitter comprises an oscillator 260 for emitting an oscillating trigger signal, which is an 8.1 kHz signal in one example. This signal is connected via amplitude modulator 262 and amplifier 264 into a buried parking lot perimeter loop wire 266 or a transmitting antenna, in the case of the hand held transmitter. A manually operable by-pass switch 268 can be provided for selectively disabling the amplitude modulation. The modulation is provided by means of a low frequency square wave oscillator 270 which may, for example, comprise a 32 Hz oscillator.

The receiver circuit 240 of FIG. 23 uses an inductor as an antenna. A capacitor in parallel with the inductor forms an LC resonator 272 at 8.1 kHz, which gives the receiver some selectivity at this frequency, rejecting interference from other signals. The resonator output is connected via amplifier 274 and rectifier 275 to a programmed micro-controller 276. The output of micro-controller 276 is connected via drive transistor 278 to the motor 236. The limit switch 254 and a motion sensor switch 280 are both connected to the micro-controller.

The micro-controller is programmed to look for either a modulated or unmodulated signal at the selected frequency, in this case 8.1 kHz, depending on whether the unit is in the reset mode (shell up) or the actuated mode (shell down). When the unit is in the reset mode, it looks only for the modulated signal and ignores any unmodulated signals received. Similarly, when the unit is in the actuated mode, it will look only for the un-modulated signal and ignore any modulated signals. A level detector triggers the controller when a strong enough signal is detected. When a modulated signal is received and the unit is in the reset mode, the computer or controller generates an appropriate drive signal for the motor 236, causing release of the wheel shell latch or locking member 224 to actuate the shell or braking member. If an un-modulated signal is received and the unit is in the actuated mode, the computer again drives the motor to reset the first locking member and to release the second locking member. Limit switch 254 is arranged to tell the computer when to stop the motor for the actuate and reset operations. The computer is switched into a low power, sleep mode when the shopping cart is not in use, and the optional motion sensor switch 280 may be used to "wake" the computer from low power mode when the cart is moved. With this feature, the computer only looks for the appropriate trigger signal when the cart has been in motion recently. Alternatively, receipt of a signal from the perimeter antenna may act to switch the system into the higher power, operative mode. A software timer returns the computer to a low power mode when no signal or movement is detected for a predetermined time period. Suitable software for performing these functions is illustrated schematically in the flow diagrams of FIGS. 24A and B.

Figure 24A:
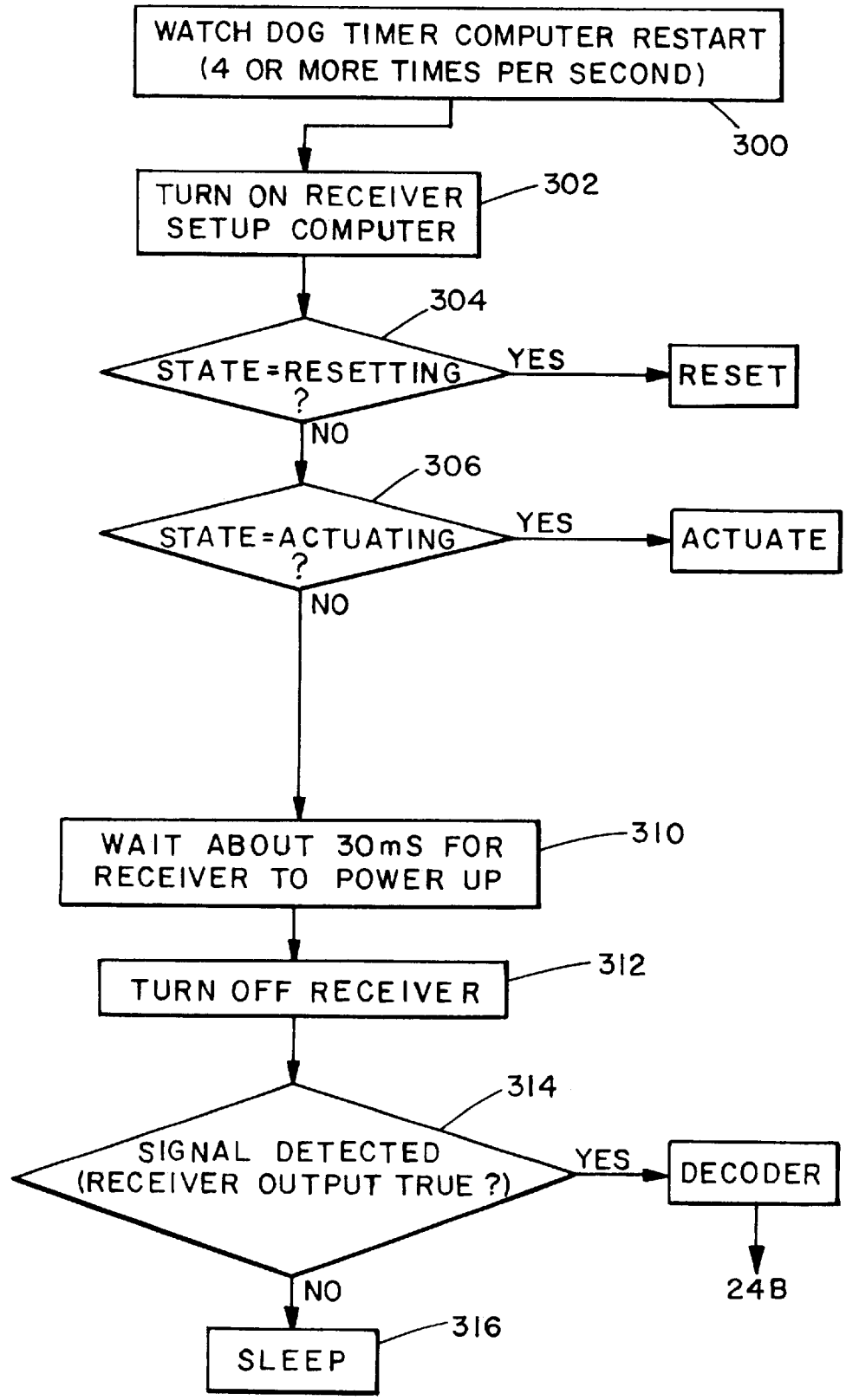
FIGS. 24A and 24B are flow diagrams illustrating the software for operating the security apparatus of FIGS. 16 to 23.
Figure 24B:
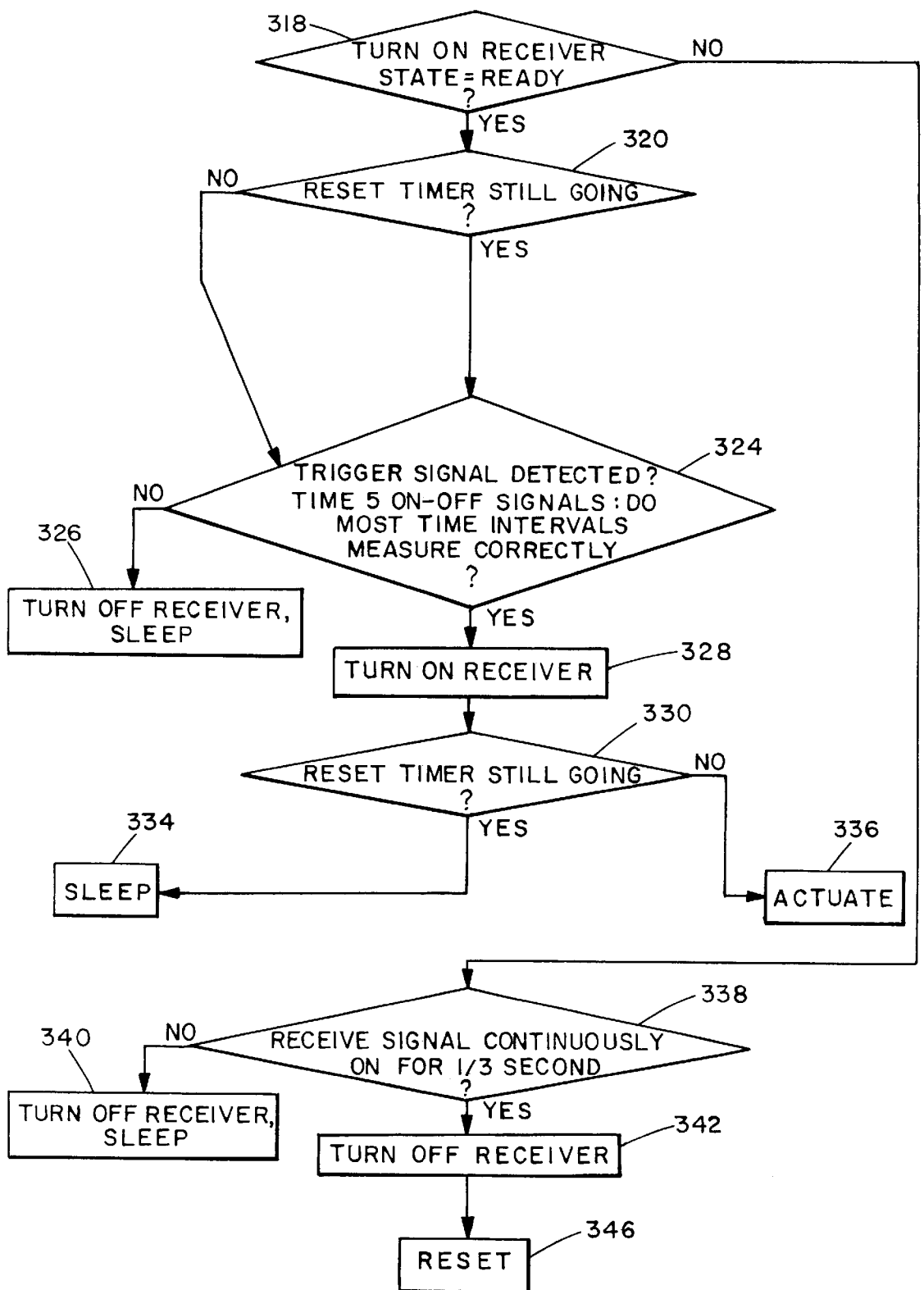

FIG. 24A illustrates the main program software for switching the computer into a sleep or low power operation during inactive periods, without the use of a motion sensor. A watchdog timer is used to restart the computer periodically from its sleep state (step 300). The receiver is turned on and the computer is set up (step 302). The software then determines whether the computer was previously in a resetting state (304) or an actuating state (306), i.e. a state of triggering the motor to actuate or reset the braking member. The reset timer is used to inhibit re-actuation of the braking unit for a predetermined time interval, preferably 1 minute, after it has been reset. After waiting a predetermined interval to enable the receiver to power up (310), the receiver is turned off (312). If a trigger signal was detected at the time the receiver was sufficiently powered up (314), the system proceeds to a decoder sequence as illustrated in FIG. 24B to determine whether an ACTUATE or RESET signal was received. If no trigger signal was detected at step 314, the system returns to the low power, sleep mode (316).

As illustrated in FIG. 24B, the first step 318 in the decoder sequence is to determine whether the system is in a ready state, i.e. is not yet actuated. If the reset timer is not going (320), the next step is to determine whether or not a trigger signal from the perimeter of the parking lot is detected (step 324). The system proceeds directly to step 324. If no trigger signal is detected, the system returns to the sleep mode (326).

If a trigger signal is detected at step 324, the receiver is turned off (328). Then, if the reset timer is still going (330), the system proceeds through step 332 back to the sleep mode at step 334. If the reset timer is not still going at step 330, the motor is turned on to actuate the brake member (336).

If the system is not in a ready state at step 318, indicating that the brake member is already actuated, the system proceeds to look for a reset signal at the hand held unit (338). If no signal is received, the system returns to the sleep mode of FIG. 24A (step 340). If a reset signal is received, the receiver is turned off (342). The system proceeds to the reset sequence (346) to release the brake member and allow it to be reset in the inoperative position.

When actuating, the computer is programmed to turn on the motor and to turn on the switch sense current. The system then looks for a signal indicating the proper limit switch state. For example, the limit switch open state may correspond to when the cam has been driven to a position releasing the locking finger, while the limit switch closed state corresponds to when the cam has been driven to a position in which locking portion 250 has been driven out of the shell opening 222. The program is designed to determine whether the proper switch state is reached within a predetermined time interval, and, if not, to retry for up to five times or more. If the proper switch state cannot be achieved, the system is stuck and remains in the stuck state until reset by store personnel. Because the motor only needs to turn the cam through one rotation to retract and release the locking or latching finger, the power only needs to be on for a relatively short period of time, of the order of one second, and can remain in a low power, sleep mode for the rest of the time. This makes the power consumption extremely low.

The operator or store personnel can therefore readily de-activate any locking device which is in the operative position, simply by operating a hand held transmitter to emit an un-modulated 8.1 kHz sine wave signal. The hand held transmitter is of relatively low power and must be held close to the receiver circuit, i.e. within around 1 foot, in order to actuate the motor. Both the hand held transmitter and the perimeter transmitter can be controlled to emit either a modulated signal, to actuate shopping cart locking devices in the vicinity, or an un-modulated signal, to release any locking devices, simply by closing or opening switch 268.

With this arrangement, an inexpensive, low power battery can be used in the receiver circuit, and very little energy is required to power the system. A trigger signal from a perimeter antenna causes a momentary "firing" of the system, sufficient to rotate the cam one half turn, and the power can then be switched off or into a low power mode. Even with a small, alkaline battery, the battery lifetime will be three years or more, since the computer and receiver are in a low power mode most of the time. Therefore, maintenance requirements for the locking device will be low, and the system will be very energy efficient. At the same time, the locking device can readily be released from a locked, shell down position simply by pressing a switch on a hand held transmitter unit which can be provided to store personnel, allowing ready recovery of carts abandoned at the perimeter of a store parking lot.

It will be understood that the transmitter and receiver circuits of FIGS. 22 and 23 may also be used to control and operate the locking devices of the previous embodiments, also reducing power requirements in those cases.

In each of the embodiments described above, the shell partially encloses the wheel and prevents damage to the wheel if a user attempts to move the cart when the shell is in the lowered, operative position. It will also reduce the risk of damage to the pavement if the cart is pushed, due to the smooth, arcuate wall of the shell which contacts the pavement. However, it will be understood that, rather than a hollow shell with two side walls as in the illustrated embodiments, one of the side walls may be eliminated. Alternatively, a single side wall may be used as the braking member, with the remainder of the shell eliminated. The rim of the side wall projects beyond the periphery of the wheel, so that when the side wall rim engages the ground, the wheel is lifted up and rendered inoperative. The locking device may be arranged to engage openings in the single wall forming the braking member in this alternative. Although this will nor protect the wheel surface as well as the shells of the previous embodiments, it uses less material and may be easier to install.

The security device of this invention will be difficult to tamper with since it is enclosed in an outer housing, and can only be released by an operator with a special transmitter, key or key and probe unit. The device is relatively easy and inexpensive to install on existing caster wheels, so that shopping carts can be readily modified to deter casual theft or removal.

When actuated and deployed in the ground engaging position, the braking or locking shell of this invention will stop the cart from rolling and simultaneously protects the plastic wheel from wearing or flat spots. Up to now, prior art braking devices have often simply locked the wheel against rotation while it still contacts the ground, resulting in wear as the wheel is dragged along the ground, and subsequent development of flat spots. Such wear is particularly encountered during the months immediately following installation, when such security devices are typically subject to the greatest challenge from curious or angry shoppers. The shell is preferably of a strong, durable metal such as steel, or of strong plastic or composite material. The presence of the shell, when deployed, is immediately obvious to the shopper, and acts to deter attempts to remove or steal the cart. Even when in the inoperative position, the presence of a security device is immediately apparent to the shopper and will have a deterrent effect. This is not true of previous wheel braking devices which were within the wheel or otherwise housed in a manner which did not reveal their presence or whether or not they were actuated.

The security device of the above embodiments is of simple design, with only a limited number of moving parts, resulting in more reliable operation and lower maintenance than previous, more complex designs. Previous shopping cart devices have been shown in use to experience extremely high failure rates, requiring intensive maintenance efforts which are both expensive and burdensome, as well as being annoying for shoppers who are using the carts properly within the store or parking lot confines. The security device of this invention is believed to be significantly more reliable and less subject to failure or accidental actuation than prior art devices, reducing both installation and maintenance costs.

Another advantage of the security apparatus as described above is that the braking forces of the loaded cart are separated from the mechanical elements of the lock or latch mechanism. Thus, lower forces will be applied to the latch or lock actuating mechanism, increasing durability.

Although some preferred embodiments of the invention have been described above by way of example only, it will be understood by those skilled in the field that modifications may be made to the disclosed embodiments without departing from the scope of the present invention, which is defined by the appended claims.

We claim:

1. A security apparatus for a wheeled vehicle having a plurality of wheels, comprising:
   a braking member for rotatably mounting on a wheel axle for movement between a raised position spaced above the ground surface and an operative position contacting the ground surface, the braking member having a portion projecting radially outwardly from the outer peripheral rim of the wheel at least in said operative position so as to separate the wheel from the ground and impede movement of a vehicle;
   a locking assembly including a latch device for releasably locking the braking member in the raised position;
   a trigger device for automatically releasing the latch device in response to a trigger signal from a signal system extending around an area in which carts are to be retained, whereby the braking member can rotate into the operative position; and
   a receiver circuit for detecting the trigger signal and operating the trigger device, in response to the trigger signal in order to release the latch device.

2. The apparatus as claimed in claim 1, wherein the braking member has first and second spaced formations for engaging said latching device in the retracted position and the operative position, respectively.

3. The apparatus as claimed in claim 2, wherein the latching device comprises a retractable lock member and biasing means for biasing the lock member into an operative position extending into engagement with one of said two formations, and the trigger device comprises means for retracting the latching device away from the first formation when actuated.

4. The apparatus as claimed in claim 3, wherein said formations comprise openings.

5. The apparatus as claimed in claim 1, including a biasing device for biasing the braking member into the operative position.

6. The apparatus as claimed in claim 1, wherein the trigger device comprises an electromechanical actuator for engaging and disengaging the latching device to operate the braking member.

7. The apparatus as claimed in claim 1, wherein the receiver circuit includes a motor for driving the latching device to release the braking member.

8. The apparatus as claimed in claim 1, wherein the latch device comprises a first latch member for releasably locking the braking member in the raised position and a second latch member for releasably locking the braking member in the operative position.

9. The apparatus as claimed in claim 8, wherein each latch member is movable between a first, retracted position released from the braking member and a second, operative position engaging the braking member, each latch member having a biasing device urging the latch member towards the operative position, the trigger device including a cam member movable between a first position and a second position, movement of said cam member from said first position to said second position urging said first latch member into a retracted position to release said braking member, and movement of said cam member from said second position to said first position urging said second latch member into a retracted position and simultaneously releasing said first latch member, the trigger device acting to move said cam member from said first position to said second position in response to said trigger signal from said signal system, and said receiver circuit responding to a second signal from a transmitter to move said cam member from said second position to said first position to release the braking member from the operative position.

10. The apparatus as claimed in claim 1, wherein the latch device comprises a first latch member movable between an advanced position engaging the braking member to hold the braking member in the raised position and a retracted position releasing the braking member for movement into the operative position, the locking assembly further including a biasing member urging the first latch member towards the braking member as the braking member is biased toward the operative position, the trigger device including a cam member movable between first and second positions to engage the first latch member and move it from the advanced position to the retracted position in response to said signal.

11. The apparatus as claimed in claim 10, wherein the receiver circuit includes a power source, a drive motor for moving the cam member, a controller for switching on the drive motor for a predetermined period on receipt of the signal, and a limit switch for switching off the motor when the cam member has moved to the second position.

12. The apparatus as claimed in claim 11, wherein the receiver circuit further includes means for switching the circuit into a low power, inactive mode when no movement of the vehicle is detected and switching the circuit into an active mode when the cart is active or when a signal is detected.

13. The apparatus as claimed in claim 11, wherein the locking assembly includes a second latch member movable between a retracted position and an advanced position in latching engagement with the braking member in the operative position, and a biasing member urging the second latch member towards the operative position, the cam member engaging the second latch member to move it from the advanced position to the retracted position on movement of the cam member from the second position to the first position, the receiver circuit being responsive to a second signal from a transmitter unit to switch on the motor for a predetermined period, and switching the motor off when the cam member is returned to the first position.

14. The apparatus as claimed in claim 11, including a moisture-proof housing enclosing the receiver circuit, the cam member being rotatable, and the motor having a rotatable drive shaft extending out of the housing and connected to the cam member.

15. The apparatus as claimed in claim 1, wherein the latch device comprises first and second latch members each movable between a retracted position and an advanced position engaging the braking member, the locking assembly further comprising a cam controlling movement of the latch members between the retracted and advanced positions, the receiver circuit including a drive motor for moving the cam in response to the trigger signal to retract the first latch member and allow the second latch member to move into an advanced position locking the braking member when it reaches the operative position, the receiver circuit being responsive to a release signal different from the cart locking signal to actuate the motor to move the cam to retract the second latch member and allow the first latch member to move into the advanced position locking the braking member when it reaches the raised position.

16. A security apparatus for a wheeled vehicle having a plurality of wheels, comprising:
a braking member for rotatable mounting on a wheel axle for movement between a raised position spaced above the ground surface and an operative position contacting the ground surface, the braking member having a portion projecting radially outwardly from the outer peripheral rim of the wheel at least in said operative position so as to separate the wheel from the ground and impede movement of a vehicle;
a locking assembly including a latch device for releasably locking the braking member in the raised position;
a trigger device for releasing the latch device in response to a trigger signal from a signal system extending around an area in which carts are to be retained, whereby the braking member can rotate into the operative position; and
the braking member comprising a hollow shell enclosing at least a sector of the wheel.

17. The apparatus as claimed in claim 16, wherein the shell has an outer arcuate wall for extending around part of the outer periphery of a wheel, and parallel side walls for extending over part of the inner and outer faces of the wheel, whereby the wheel is partially enclosed within the shell.

18. A security apparatus for a wheeled vehicle having a plurality of wheels, comprising:
a braking member for rotatable mounting on a wheel axle for movement between a raised position spaced above the ground surface and an operative position contacting the around surface, the braking member having a portion projecting radially outwardly from the outer peripheral rim of the wheel at least in said operative position so as to separate the wheel from the ground and impede movement of a vehicle;
a locking assembly including a latch device for releasably locking the braking member in the raised position;
a trigger device for releasing the latch device in response to a trigger signal from a signal system extending around an area in which carts are to be retained, whereby the braking member can rotate into the operative position; and a housing for securing to a caster, the latching and trigger devices being mounted in the housing adjacent said braking member.

19. A combined vehicle caster and security assembly, comprising:
a wheel supporting yoke;
a wheel axle secured to the yoke;
a wheel rotatably mounted on the axle, the wheel having an outer peripheral surface for rolling along a around surface;
a braking member rotatably mounted on the axle for movement between a raised position spaced above the ground surface and an operative position contacting the ground surface, the braking member having a portion projecting radially outwardly from the outer peripheral rim of the wheel at least in said operative position so as to separate the wheel from the surface and impede motion of the vehicle;
a locking device movable between an advanced position locking the braking member in the raised position, and an inoperative position releasing the braking member;
an actuator for moving the locking device into the inoperative position in response to movement of the wheel outside a predetermined area, whereby the braking member moves into the operative position to prevent normal operation of the vehicle; and
a receiver circuit for controlling operation of the actuator, the receiver circuit including a receiver for detecting two different signals, one of the signals comprising an actuate signal and the other signal comprising a reset signal, and a controller responsive to said actuate signal to operate the actuator to move the locking device into the inoperative position to release the braking member for movement into the operative position, and responsive to said reset signal to release the locking device for movement into the advanced position when the braking member is returned to the raised position.

20. The assembly as claimed in claim 19, including a biasing device for biasing said locking device into said advanced position in the raised and operative positions of said braking member, whereby said locking device locks said braking member in both said raised position and said operative position.

21. The assembly as claimed in claim 20, wherein said braking member has at least two spaced openings for receiving said locking device in said raised and operative positions, respectively.

22. The assembly as claimed in claim 19, including a pawl member and biasing means for biasing said pawl member against said braking member, the braking member having a series of spaced openings, said pawl member having a ratcheting engagement in said openings to permit rotation of said braking member in a first direction between said raised and operative positions, and preventing rotation of said braking member back out of said operative position.

23. The apparatus as claimed in claim 19, wherein the braking member comprises a hollow shell enclosing at least a sector of the wheel.

24. The apparatus as claimed in claim 23, wherein the sector has an angle in the range from 20° to 210°.

25. The apparatus as claimed in claim 24, wherein the sector angle enclosed by the shell is approximately 160°.

26. The apparatus as claimed in claim 19, wherein said yoke comprises a housing enclosing at least part of said wheel and braking member in said raised position, said locking device and actuator being fully enclosed in said housing.

27. The assembly as claimed in claim 19, wherein the locking device includes first and second latch members each movable between an advanced position and an inoperative position, the first latch member in the advanced position releasably locking the braking member in the raised position and the second latch member in the advanced position releasably locking the braking member in the operative position, the controller being responsive to the actuate signal to move the first latch member into the inoperative position to release the braking member to move into the operative position and to release the second latch member for movement into the advanced position when the braking member reaches the operative position, and being responsive to the reset signal to move the second latch member into the inoperative position to release the braking member for movement back into the raised position, and to release the first latch member for movement into the advanced position locking the braking member in the raised position.

28. The assembly as claimed in claim 27, wherein the braking member has a first opening aligned with said first latch member in the raised position and a second opening aligned with said second latch member in the operative position.

29. A vehicle security system, comprising:

a plurality of vehicles each having a plurality of caster wheels;

a locking apparatus secured on at least one caster wheel of each vehicle including a braking member movable between an inoperative position in which the wheel is free to rotate and an operative position preventing normal operation of the vehicle along a ground surface, a latching device for releasably locking the braking member in the inoperative and operative positions, respectively, and a controller for controlling actuation of the latching device;

a perimeter antenna for surrounding an area in which shopping carts are to be retained, the perimeter antenna emitting a continuous brake actuate signal; and at least one transmitter unit separate from the perimeter antenna for emitting a brake release signal different from the brake actuate signal;

the locking apparatus including a receiver for receiving the brake actuate and brake release signals, the controller being connected to the receiver and operating the latching device to release the braking member from the inoperative position and allow it to move into the operative position on detection of a brake actuate signal, and to release the braking member from the operative position and allow it to be moved into the inoperative position on detection of brake release signal.

30. The system as claimed in claim 29, wherein the controller includes a motion sensor, the controller having a low power, inactive mode and a higher power, active mode, and being switched into the low power mode when no movement of shopping cart is detected for a predetermined time period, and switching into the higher power, active mode when movement of the cart is detected or when a signal is detected.

31. A vehicle security system, comprising:

a plurality of vehicles each having a plurality of caster wheels;

a locking apparatus secured on at least one caster wheel of each vehicle including a braking member movable between an inoperative position in which the wheel is free to rotate and an operative position preventing normal operation of the vehicle along a ground surface, a latching device for releasably locking the braking member in the inoperative and operative positions, respectively, and a controller for controlling actuation of the latching device;

a perimeter antenna for surrounding an area in which shopping carts are to be retained, the perimeter antenna emitting a continuous brake actuate signal;

at least one transmitter unit for emitting a brake release signal different from the brake actuate signal;

the locking apparatus including a receiver for receiving the brake actuate and brake release signals, the controller being connected to the receiver and operating the latching device to release the braking member from the inoperative position and allow it to move into the operative position on detection of a brake actuate signal, and to release the braking member from the operative position and allow it to be moved into the inoperative position on detection of brake release signal; and the caster wheel including a wheel axle and a wheel rotatably mounted on the axle, the braking member being rotatably mounted on the axle independently of the wheel for rotation between the inoperative and operative positions, the braking member being raised above a ground surface on which the cart rests when in the inoperative position, and contacting the ground surface in the operative position, the braking member having a portion projecting radially outwardly from the wheel to contact the ground in the operative position whereby the wheel is separated from the ground surface and motion of the vehicle is impeded.

32. The assembly as claimed in claim 31, wherein the latching device includes first and second latch members each movable between an advanced position and an inoperative position, the first latch member in the advanced position releasably locking the braking member in the raised, inoperative position and the second latch member in the advanced position releasably locking the braking member in the operative position, the controller being responsive to the actuate signal to move the first latch member into the inoperative position to release the braking member to move into the operative position and to release the second latch member for movement into the advanced position when the braking member reaches the operative position, and being responsive to the reset signal to move the second latch member into the inoperative position to release the braking member for movement back into the raised position, and to release the first latch member for movement into the advanced position locking the braking member in the raised position.

33. The assembly as claimed in claim 32, wherein the first and second latch members operate alternately, whereby the first latch member is in the advanced position when the second latch member is in the inoperative position, and vice versa.

34. A method of impeding movement of a wheeled vehicle outside a predetermined area, comprising the steps of:

transmitting a trigger signal from a perimeter antenna extending around the perimeter of an area to be protected;

providing a braking member on a wheel of a vehicle to be used within the protected area, the braking member being movable between a raised position raised above a ground surface and an operative position contacting the ground surface so as to separate the wheel from the ground and impede movement of the vehicle;

releasably latching the braking member in the raised position;

detecting the trigger signal if the vehicle is moved to a location adjacent the perimeter antenna;

switching a trigger circuit into a high power mode on detection of the trigger signal;

operating the trigger circuit to actuate an actuator to release the latch on detection of the trigger signal, whereby the braking member can rotate into the operative position; and switching the trigger circuit back into a low power mode.

35. The method as claimed in claim 34, including the steps of:

releasably latching the braking member in the operative position;

detecting a release signal from a hand held transmitter;

switching the trigger circuit from the low power mode to the high power mode on detection of the release signal;

operating the trigger circuit to actuate the actuator to release the braking member on detection of the release signal, whereby the braking member can be returned to the raised position; and switching the trigger circuit back into a low power mode.

36. The method as claimed in claim 35, wherein the trigger circuit is maintained in the high power mode for a predetermined time interval sufficient to release the latch.

37. The method as claimed in claim 36, wherein the time interval is approximately one second.

* * * * *